United States Patent
Randon et al.

(10) Patent No.: US 11,100,710 B2
(45) Date of Patent: Aug. 24, 2021

(54) EXTRACTING A FEATURE TREE FROM A MESH

(71) Applicant: DASSAULT SYSTEMES, Velizy-Villacoublay (FR)

(72) Inventors: Guillaume Randon, Velizy-Villacoublay (FR); Serban Alexandru State, Velizy-Villacoublay (FR); Fernando Manuel Sanchez Bermudez, Velizy-Villacoublay (FR)

(73) Assignee: DASSAULT SYSTEMES, Velizy-Villacoublay (FR)

(*) Notice: Subject to any disclaimer, the term of this patent is extended or adjusted under 35 U.S.C. 154(b) by 0 days.

(21) Appl. No.: 16/730,833

(22) Filed: Dec. 30, 2019

(65) Prior Publication Data
US 2020/0211281 A1 Jul. 2, 2020

(30) Foreign Application Priority Data
Dec. 29, 2018 (EP) .................................. 18306889

(51) Int. Cl.
| | |
|---|---|
| *G06T 17/00* | (2006.01) |
| *G06T 17/20* | (2006.01) |
| *G06T 7/00* | (2017.01) |
| *G06T 17/10* | (2006.01) |
| *G06T 19/20* | (2011.01) |

(52) U.S. Cl.
CPC .......... *G06T 17/205* (2013.01); *G06T 7/0002* (2013.01); *G06T 17/005* (2013.01); *G06T 17/10* (2013.01); *G06T 19/20* (2013.01)

(58) Field of Classification Search
CPC ... G06T 17/205; G06T 7/0002; G06T 17/005; G06T 17/10
See application file for complete search history.

(56) References Cited

U.S. PATENT DOCUMENTS

| | | | |
|---|---|---|---|
| 2004/0075656 A1* | 4/2004 | Kimia | G06T 17/00 345/420 |
| 2005/0021318 A1* | 1/2005 | Inoue | G06K 9/469 703/2 |
| 2007/0036434 A1* | 2/2007 | Saveliev | G06K 9/52 382/173 |

(Continued)

OTHER PUBLICATIONS

Extended Search Report dated Apr. 3, 2019 in Europe Patent Application No. 18306889.9-1230; 7 pgs.

(Continued)

*Primary Examiner* — Sarah Lhymn
(74) *Attorney, Agent, or Firm* — Oblon, McClelland, Maier & Neustadt, L.L.P.

(57) ABSTRACT

The disclosure notably relates to a computer-implemented method for extracting a feature tree from a mesh. The method includes providing a mesh, computing a geometric and adjacency graph of the provided mesh, wherein each node of the graph represents one region of the mesh and comprises a primitive type and parameters of the region, each connection between two nodes is an intersection between the respective surfaces of the regions represented by the two connected nodes. The method also includes instantiating for each node of the graph, a surface based on the identified primitive type and parameters of the region.

20 Claims, 19 Drawing Sheets

(56) References Cited

U.S. PATENT DOCUMENTS

| | | | | |
|---|---|---|---|---|
| 2007/0058865 | A1* | 3/2007 | Li | G06K 9/6224 |
| | | | | 382/173 |
| 2011/0087350 | A1* | 4/2011 | Fogel | G06T 19/00 |
| | | | | 700/98 |
| 2012/0330636 | A1* | 12/2012 | Albou | G16B 15/00 |
| | | | | 703/12 |
| 2016/0224694 | A1* | 8/2016 | Boussuge | G06F 30/00 |
| 2016/0275209 | A1* | 9/2016 | Kelly | G06T 19/00 |
| 2018/0188415 | A1* | 7/2018 | Imhof | G06F 30/20 |

OTHER PUBLICATIONS

Roseline Beniere, et al.; "A Comprehensive Process of Reverse Engineering from 3D Meshes to CAD Models"; Computer Aided Design; vol. 45, No. 11; Nov. 1, 2013; ISSN: 0010-4485; 12 pgs.

Jung Wang, et al.; "A Framework for 3D Model Reconstruction in Reverse Engineering"; Computers & Industrial Engineering; vol. 63, No. 4; Dec. 1, 2012; XP055110577; ISSN: 0360-8352; 13 pgs.

Francesco Buonamici, et al.; "Reverse Engineering Modeling Methods and Tools: A Survey"; Computer-Aided Design and Applications; vol. 15, No. 3; Nov. 16, 2017; XP055574952; 23 pgs.

Extended Search Report dated Jul. 19, 2019 in Europe Patent Application No. 18306888.1-1230; 15 pgs.

Shixin Xu, et al.; "Step-Nc Based Reverse Engineering of In-Process Model of Nc Simulation"; The International Journal of Advanced Manufacturing Technology, Springer, London; Feb. 12, 2016; XP036061433; ISSN: 0268-3768; 22 pgs.

S. Joshi, et al.; "Graph-Based Heuristics for Recognition of Machined Features from a 3D Solid Model"; Computer Aided Design, vol. 20, No. 2; Mar. 1, 1988; XP055286643; ISSN: 0010-4485; 9 pgs.

S. Gauthier, et al.; "Analysis of Digitized 3D Mesh Curvature Histograms for Reverse Engineering"; Computers in Industry, Elsevier, Amsterdam, NL; vol. 92, Jun. 24, 2017; XP085294090; ISSN: 0166-3615; 17 pgs.

Silvere Gauthier, et al.; "Digitized 3D Mesh Segmentation Based on Curvature Analysis"; Electronic Imaging; vol. 2017, No. 20; Jan. 29, 2017; XP055603726; ISSN: 2470-1173; 7 pgs.

* cited by examiner

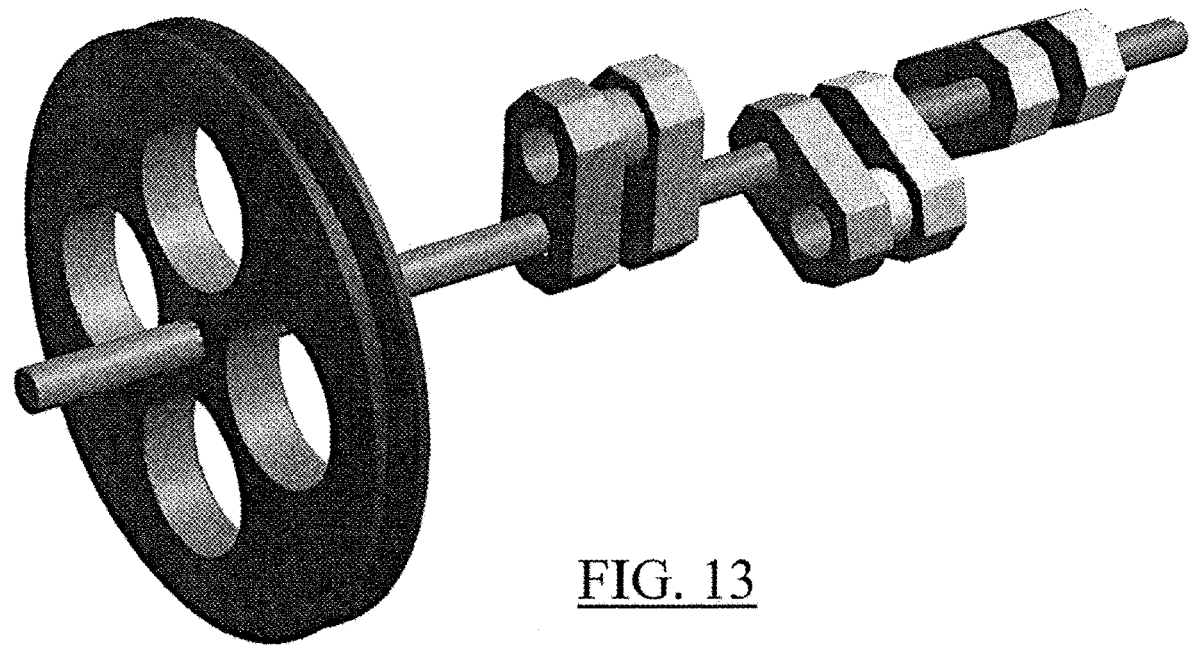
FIG. 13
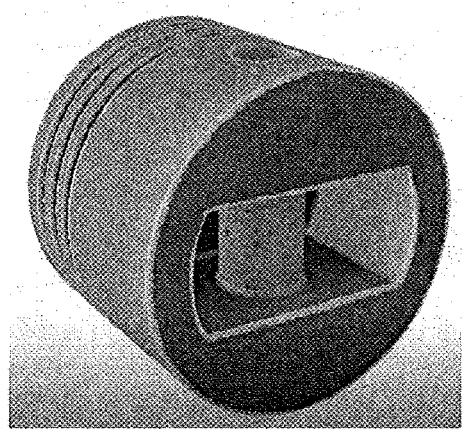 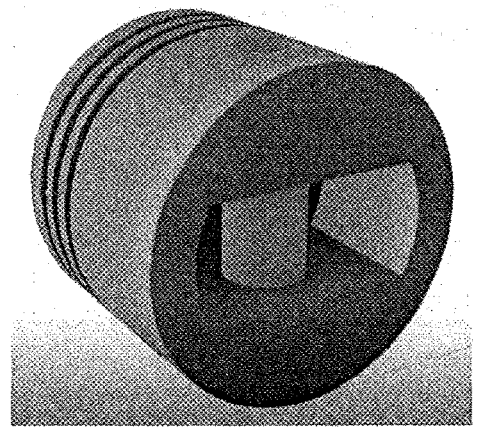
FIG. 14a  FIG. 14b

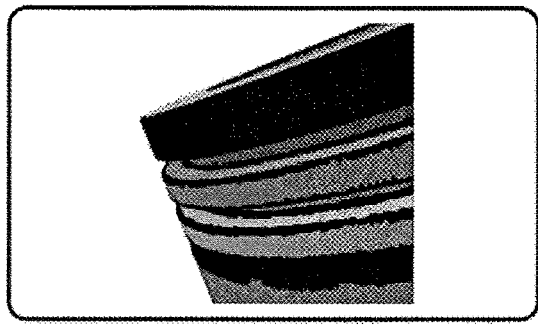
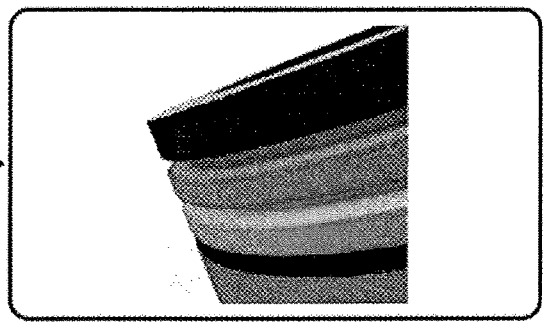
FIG. 15a    FIG. 15b
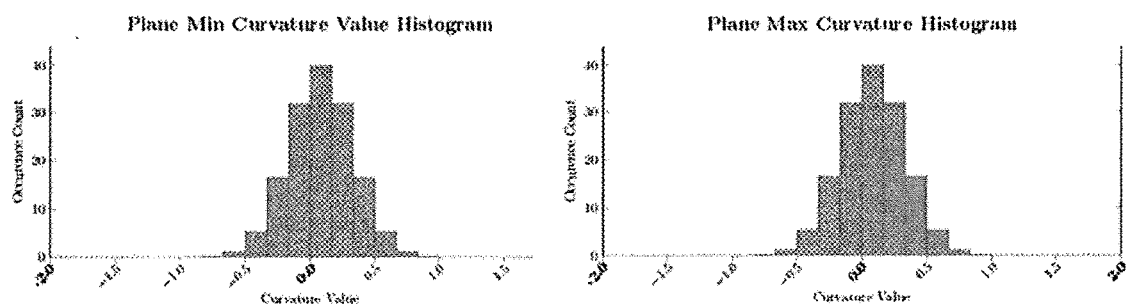
FIG. 16
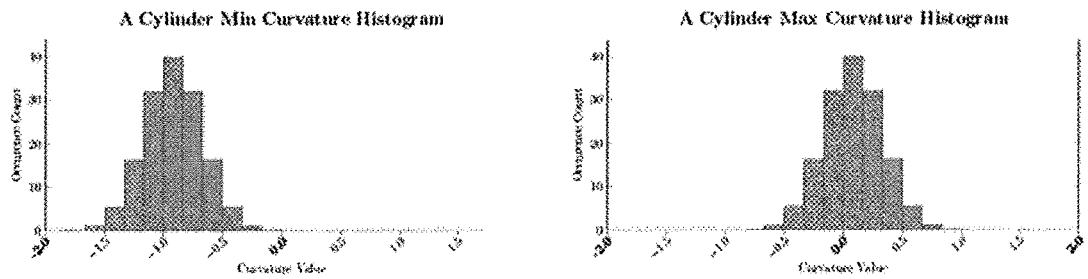
FIG. 17

EXTRACTING A FEATURE TREE FROM A MESH

CROSS-REFERENCE TO RELATED APPLICATIONS

This application claims priority under 35 U.S.C. § 119 or 365 to European Application No. 18306889.9, filed Dec. 29, 2018. The entire contents of the above application(s) are incorporated herein by reference.

FIELD OF THE INVENTION

The disclosure relates to the field of computer programs and systems, and more specifically to a method, system and program for extracting a feature tree from a mesh.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

The construction (or the reconstruction) of a feature tree from a mesh allows performing further 3D design operations the 3D model represented by the feature tree in dedicated software (e.g. CAD/CAE/CAM/PDM/ . . . systems). A Feature Tree refers to a tree organizing operations (for example Boolean operations) on solid representations and on geometric primitives (like cubes, cylinders, sketches via extrudes . . . ). This type of representation of solids falls in the category of Constructive Solid Geometry approaches (CSG). An existing mesh can be analyzed for the purpose of extracting the implicit knowledge contained in the mesh. For instance, a mesh representing an object of the real world such as a mechanical part can be produced by metrology precision scanning, but the semantic that is implicitly contained in the mesh cannot be exploited by a modeling software. As another example, a CAD system can emulate tools movements of a tool machines used for manufacturing objects and can output a mesh from files containing machine commands and specification. Again, reverse engineering these files for obtaining a feature tree is not always possible, or very difficult.

In "Topology Reconstruction for B-Rep Modeling from 3D Mesh in Reverse Engineering Applications, 2012", Bénière et al. have worked intensely on extracting sufficient information from meshes to build back exact B-Rep models using mean curvature. B-Rep refers to a way to define a solid via its boundaries. A B-Rep definition is valid if those boundaries delimit, in a non-ambiguous way, a closed sub space. Some meshes might be valid boundary representations of solids and thus might be classified as B-Rep. On the other hand, most of the time B-Rep is used to designate the type of representation used in CAD programs, i.e. a set of connected faces, each of them defined by a surface with an exact description, defining a closed volume. This representation is often called exact B-Rep. By analyzing the curvature on the triangles of a mesh with respect to the overall mesh curvature distribution they build sub meshes which are potential candidates to being faces of a B-Rep representation. When the sub meshes do not touch their neighbors, they expand them until they can recover some of the limits between adjacent faces. They expand the sub meshes by aggregating triangles based on a notion of distance to the already built sub mesh. With complex and tortuous geometries this process is not guaranteed to recover valid limits. Besides, this approach focuses only on reconstructing an exact B-Rep and not a CAD process/feature tree.

In "Extraction of generative processes from B-Rep shapes and application to idealization transformations", 2014, F. Boussuge et al have provided extensive work on 'process tree' reconstruction starting from B-Rep representations. Their notion of 'process tree' is similar to a feature tree. To build the process tree, they analyze the B-Rep's faces and the intersections between faces to build sketches that can be extruded later on. Their approach considers that an exact B-Rep is already available and devises methods to build what they call the process tree (a simplified feature tree) from it. However, the resulting process tree is limited to solid addition, i.e. no subtraction operations are generated. Since the exact B-Rep is available, the algorithm proceeds iteratively, i.e. feature solids are identified and removed by Boolean operations from the current B-Rep until the whole solid is processed. This approach cannot work if the initial input is not an exact B-Rep, except if Boolean operations between exact and polyhedral solids are supported which is not the case in state of the art.

Hence, being able to obtain a feature tree from a mesh has tremendous value because it allows advanced edition and supports the full range of design tools traditionally offered by CAD/CAE/CAM/PDM/ . . . systems.

Within this context, there is still a need for an improved method for extracting a feature tree from a mesh.

SUMMARY OF THE INVENTION

It is therefore provided a computer-implemented method for extracting a feature tree from a mesh. The method comprises:
  providing a mesh; computing a geometric and adjacency graph of the provided mesh, wherein:
  each node of the graph represents one region of the mesh and comprises a primitive type and parameters of the region;
  each connection between two nodes is an intersection between the respective surfaces of the regions represented by the two connected nodes;

instantiating for each node of the graph, a surface based on the identified primitive type and parameters of the region;

for each node of the graph:
computing one outer intersection loop and possibly one or more inner intersection loops, each intersection loop being obtained from an ordered list of nodes of the graph that are connected to the said each node;
computing at least one sketch from the outer intersection loop and possibly one or more sketches respectively from possibly one or more inner intersection loops of the instantiated surface;

applying a sweep operation to each computed sketch therefore generating a solid for each sketch;

computing a set of possible combinations of add or remove operations between the obtained solids, and obtaining a final solid for each computed combination;

computing a similarity score of each final solid with the input mesh;

identifying the most similar final solid with the input mesh based on the similarity score, the combinations of add or remove operations of the identified most similar final solid corresponding to the feature tree of the mesh.

The method may comprise one or more of the following:

computing a set of possible combinations of add or remove operations between the obtained solids comprises:—using an add operation for a solid generated with an outer intersection loop that is convex;—using a remove operation for a solid generated with an outer intersection loop that is concave;—using an add operation for a solid generated with an inner intersection loop that is concave;—using a remove operation for a solid generated with an inner intersection loop that is convex;

computing a set of possible combinations of add or remove operations between the obtained solids further comprises: for each generated solid with an outer intersecting loop with no determinable convexity or concavity, using both an add and a remove operation;

computing a set of possible combinations of add or remove operations between the obtained solids further comprises:—if a solid to be used with a remove operation is adjacent only to the faces of one single generated solid to be used with an add operation, performing the remove operation after the add operation;—if a solid to be used with a remove operation is adjacent only to the faces of two or more generated solids to be used with an add operation, performing the remove operation after the add operations;—if a solid to be used with an add operation is adjacent only to the faces of one single generated solid to be used with a remove operation, and if the solid to be used with the remove operation is adjacent only to the faces of one single generated solid to be used with an add operation or is adjacent only to the faces of two or more generated solids to be used with an add operation, first performing a remove operation of the solid to be used with an add operation on the solid to be used with a remove operation and then only performing a remove operation of the result of the remove performed first.

applying a sweep operation to each computed sketch therefore generating a solid for each sketch comprises:—computing, for each sketch, a sweep direction and a sweep length from the intersections loops that are adjacent to the one outer intersection loop and from the intersections loops that are adjacent to the possibly one or more inner intersection loops of the sketch;

computing the sweep direction and the sweep length is performed for the one outer intersection loop of the sketch and for each of the possible one or more intersection loops, the computing comprising for each intersection loop of the sketch:—identifying one or more sketch points on the intersection loop, a sketch point being a point that is common to the intersections loops that are adjacent to the intersection loop of the sketch;—for each identified sketch point, identifying a target point that is a point common to the intersections loops that are adjacent to the intersection loop of the sketch;—computing for each sketch point a vector joining the sketch point to the target point, the direction of the vector being the sweep direction and the norm of the vector being the sweep length;

when two or more vectors have been computed:—determining that the vectors have a same direction and that the surfaces of the intersections loops that are adjacent to each intersection loop of the sketch are parallel to this same direction;—applying the sweep operation that is an extrusion therefore generating the solid of the sketch;

for each different value of the norms of the vectors, applying the sweep operation; or selecting the smallest value among the values and applying the sweep operation for the selected value;

when two or more vectors have been computed:—determining that the vectors have a same direction and that one or more surfaces of the intersections loops that are adjacent to each intersection loop of the sketch are not parallel to this same direction;—detecting a common revolution axis to all the surfaces of the intersections loops that are adjacent to each intersection loop of the sketch are parallel to this same direction;—estimating an angle for revolution for each sketch point and its corresponding target point;—applying the sweep operation that is a revolution around the detected common revolution axis to the estimated angle;

when detecting the common revolution axis:—if the surfaces of the intersections loops that are adjacent to an intersection loop of the sketch belong to a primitive of the type selected among a cylinder, a cone, a sphere, and/or a torus, verifying that the adjacent surfaces are defined with the axis of revolution;—if the surfaces of the intersections loops that are adjacent to an intersection loop of the sketch belong to a primitive of the type plane, verifying that the adjacent surfaces are parallel or orthogonal to the axis of revolution.

for each different value of the estimation of the angle for revolution, applying the sweep operation; or selecting the smallest value among the values and applying the sweep operation for the selected value;

after instantiating, for each node of the graph, a surface based on the identified primitive type and parameters of the region:—detecting that the instantiated surface is not adjacent with any plane;—instantiating a new plane outside the bounds of the mesh;—computing an intersection of the instantiated surface with the new plane, the intersection forming a loop on the new plane; and—computing at least one sketch from the intersection loop.

It is further provided a computer program comprising instructions for performing the above method.

It is further provided a computer readable storage medium having recorded thereon the computer program.

It is further provided a system comprising a processor coupled to a memory and a graphical user interface, the memory having recorded thereon the computer program.

In example, the above method may be combined with a computer-implemented method for generating (or computing) a structured three-dimensional (3D) model from a mesh. The method for computing (or generating) the structured three-dimensional (3D) model from a mesh comprises providing a mesh that comprises faces, each face of the mesh including a normal and principal curvature values; computing a distribution of the principal curvature values over the whole mesh by counting the number of occurrences of discretized curvature values; identifying in the computed distribution one or more dominant ranges of principal curvature values; for each identified dominant range, computing one or more regions of the mesh that comprises faces belonging to the identified dominant range; for each computed region, detecting a primitive type by using the curvatures values of all faces of the region and identifying parameters of the detected primitive by using the mesh surface of the region.

The method for computing (or generating) the structured three-dimensional (3D) model from a mesh may comprise one or more of the following:
- building a geometric and adjacency graph of the structured 3D representation of the provided mesh, wherein each node of the graph represents one of the computed regions and comprises the identified primitive type and parameters of the region; and each connection between two nodes is an intersection between the respective surfaces of the regions represented by the nodes;
- the building of a geometric and adjacency graph further comprises, for each connection: each connection between two nodes is an intersection between the respective surfaces of the regions represented by the nodes with associated convexity, concavity and positions information per connection between nodes;
- the identification in the computed distribution of the one or more dominant ranges of principal curvature values comprises determining in the computed distribution a local maximum between two successive local minima, and identifying the faces comprised between the two successive local minima as belonging to the said one or more a dominant range;
- while the number of occurrences for a local maximum is equal and/or above a predetermined value, repeating the determination in the computed distribution a local maximum and the identification of the faces as belonging to the said one or more dominant range, and wherein before each repetition, the faces previously identified as belonging to the said one or more a dominant range are discarded and the distribution of the faces according to their principal curvature values is recomputed;
- the principal curvature values of each faces comprise a minimum curvature value and a maximum curvature value; computing the distribution of the faces comprises: computing a first distribution of the minimum curvature values over the whole mesh by counting the number of occurrences of discretized curvature values, and computing a second distribution of the maximum curvature values over the whole mesh by counting the number of occurrences of discretized curvature values; and wherein the subsequent steps of the method are performed for the first and second distributions;
- applying a Gaussian kernel is to the resulting distribution;
- for each computed region, applying a region growing, the grow being guided by a distance between faces, the distance being weighted by the curvature values to aggregate all faces not already assigned to a computed region;
- the region growing comprises assigning a same first score to the faces of a first set of faces, the first set of faces comprising the faces belonging to none of the computed regions, and assigning a same second score of zero for each face belonging to one of the computed regions, the first score being larger than the second score; testing each face of the first set by: for each adjacent regions of the face, computing a third score being based on a distance between the face and the adjacent region and on a difference in principal curvature values between the face and the adjacent region; if the third score is smaller than the first score: setting the first score to the third score and recording to which region the third score corresponds; adding the neighbors of the tested face to the first set of faces if the neighbors do not belong to the first set of faces; if the third score is larger than the first score, removing the tested face from the first set; regrouping the tested faces initially in the first set with the region associated with the best third score they have;
- the testing stops when all the faces of the second set have been tested;
- after computing regions of the mesh, computing intersection loops between the computed regions;
- after the computation of intersection loops, for each intersection loop: collecting an ordered list of regions composing this intersection loop, and concavity, convexity and position information for each edge of the said intersection loop;
- the identifying parameters of the primitive by using a surface for the region comprises estimating parameters of the detected primitive with a least optimization of those parameters.

It is further provided a computer program comprising instructions for performing the methods of generating the structured three-dimensional (3D) model from a mesh or for performing both methods of generating the structured three-dimensional (3D) model from a mesh and extracting a feature tree from a mesh.

It is further provided a computer readable storage medium having recorded thereon the computer program for performing the methods of generating the structured three-dimensional (3D) model from a mesh or for performing both methods of generating the structured three-dimensional (3D) model from a mesh and extracting a feature tree from a mesh.

It is further provided a system comprising a processor coupled to a memory and a graphical user interface, the memory having recorded thereon the computer program for performing the methods of generating the structured three-dimensional (3D) model from a mesh or for performing both methods of generating the structured three-dimensional (3D) model from a mesh and extracting a feature tree from a mesh.

BRIEF DESCRIPTION OF THE DRAWINGS

Embodiments will now be described, by way of non-limiting example, and in reference to the accompanying drawings, where:

FIG. 13 shows a screenshot of regions of uniform curvature of the mesh of FIG. 5;

FIGS. 14a and 14b are screenshots illustrating before and after region growing process;

FIGS. 15a and 15b are screenshots illustrating before and after region growing process;

FIG. 16 is an example of a principal curvature value distribution of a plane entity;

FIG. 17 is an example of a principal curvature value distribution of a cylinder entity;

DETAILED DESCRIPTION OF THE INVENTION

Figure 19:
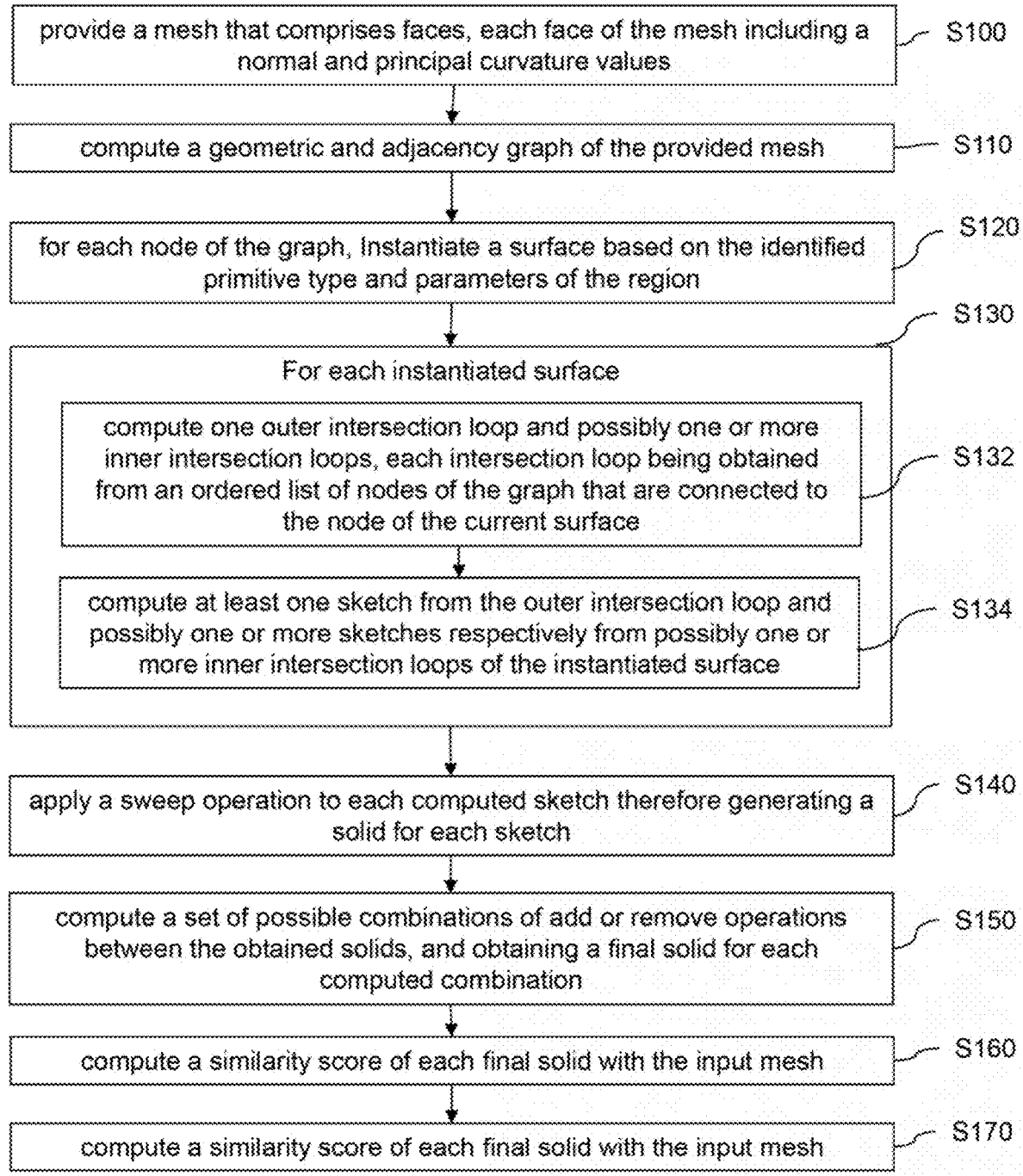
FIG. 19 shows a flowchart of an example of the method according to the embodiments.

With reference to the flowchart of FIG. 19, it is proposed a computer-implemented method for extracting a feature tree from a mesh. The method comprises providing a mesh, for instance a raw mesh obtained by metrology precision scanning. The method also comprises computing a geometric and adjacency graph of the provided mesh. In the geometric and adjacency graph of the provided mesh, each node represents one region of the mesh and each node comprises a primitive type and parameters of the region. Still in the geometric and adjacency graph, each connection between two nodes represents an intersection between the respective surfaces of the regions represented by the two connected nodes. The method further comprises instantiating a surface for each node of the graph. The instantiation is based on the identified primitive type and parameters of the region. Then, the method further comprises performing the following computations for each node of the graph: (a) one outer intersection loop is computed, and possibly one or more inner intersection loops are computed, the one outer intersection loop and the possible one or more inner intersection loops are obtained by an ordered list of nodes of the graph that are connected to the current node for which the first and second operation are performed; (b) at least one sketch is computed from the outer intersection loop and possibly one or more sketches respectively from the possible one or more inner intersection loops of the instantiated surface. The method also comprises applying a sweep operation to each computed sketch therefore generating a solid for each sketch. Furthermore, the method comprises computing a set of possible combinations of add or remove operations between the obtained solids and obtaining a final solid for each computed combination. The method also comprises computing a similarity score of each final solid with the input mesh and identifying the most similar final solid with the input mesh based on the similarity score, the combinations of add or remove operations of the identified most similar final solid corresponding to the feature tree of the mesh.

Such a method improves the extraction of a feature tree from a mesh. Notably, the reconstruction of the feature tree relies on the results of an enhanced analysis operations performed on the mesh for creating a geometric and adjacency graph of the mesh. This allows directly generating a feature tree without first generating an intermediary exact B-Rep. The B-Rep construction solutions are often fragile, i.e. they either entirely succeed or fail to produce a valid structured representation of a solid, depending on the quality of the mesh that is provided. In the present method, the computed geometric and adjacency graph of the provided mesh is less sensitive to the quality of the mesh. In addition, the method instantiates edges of oriented loops to pilot a CAD modeler. This results in a series of planar sketches, which are subsequently extruded or revolved. The resulting feature solids are then assembled via Boolean operations into a resulting feature tree. The method thus exploits correspondences with the initial mesh in order to distinguish between multiple possible intersection solutions for computed sketches. The geometric and adjacency graph is also exploited to compute extrusion distances and revolution angles based on the instantiated sketches. The convexity information is used to determine whether a generated feature solid adds or removes matter in the final feature tree.

Hence, the method provides a feature tree builder that can extract the most relevant information from a geometry and the adjacency graph obtained by the mesh analysis and derives a sequence of operations that by definition lead to a valid solid. (Re)Building a valid B-Rep as an intermediary step is not needed: the known drawbacks of (re)building a valid B-Rep are thus avoided.

Furthermore, the method ensures that all generated solids are well defined and watertight. This is especially interesting in cases in which the information obtained by mesh analysis would have failed to rebuild a complete B-Rep. Incomplete mesh data, geometric complexities and noise may lead to an inaccurate adjacency graph and thus to an invalid B-Rep with other methods. On the contrary, the present method generates a valid solid as long as it is possible to extract sufficient information from the mesh. By cherry picking the usable parts of the geometry for the construction of the feature tree, the method is less fragile and builds valid and meaningful solids. Even if those parts do not necessarily reflect the full details of the original mesh (for instance if the provided mesh is incomplete), the parts can serve as a valid base for modeling operations and by extension for any usage one can make of traditional exact CAD models. For example, the user can use part of our result as an intermediary step only and edit any element through its parameters.

Figure 3:
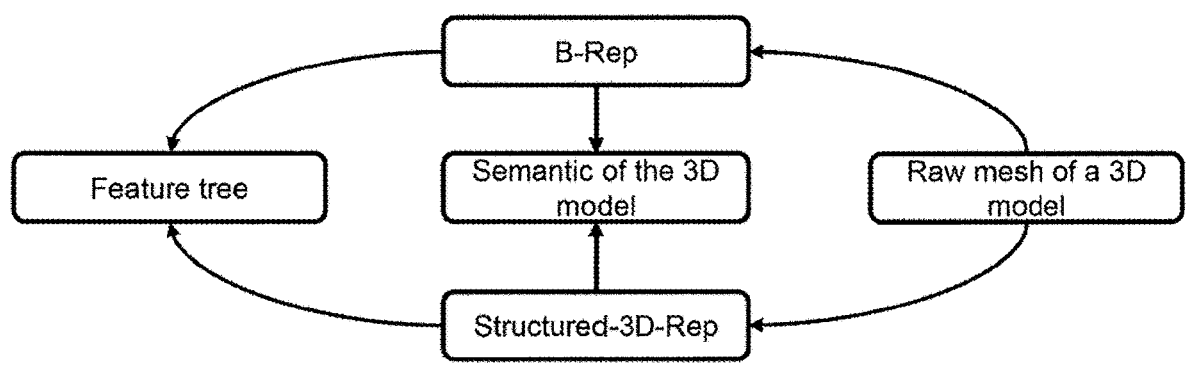
FIG. 3 shows an example of a comparison between the method according to the embodiments and the prior art.

Hence, as illustrated on FIG. 3 that illustrates differences between the known method and the present method, the present method does not require an exact B-Rep model as input that can be difficult (or impossible) to compute and that requires many computing resources (e.g. CPU and memory); the method can take as input a mesh. In addition, the solids that are computed from the sketch are generated in a single pass, thus decreasing the consumptions of computing resources compared with iterative solutions.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the step of providing the mesh may be the result of a user selection of a mesh stored, e.g. on a database.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A mesh (and by extension the generated structured 3D model) may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). The mesh may also represent the geometry of product to be manufactured in the real world subsequent to a scanning of the product, e.g. the mesh comes from metrology precision scanning, subsequent mesh design operations, e.g. performed with a software that allows mesh editing. The mesh may also represent the geometry of a product to be manufactured in the real world subsequent to its retrieval from a machine tool data file, a 3D printer file, metrology devices data files . . . . The mesh may also represent the geometry of product to be manufactured in the real world subsequent to point clouds that have been processed by dedicated meshing software or that have been authored in Digital Content Creation tool that can produce assets for 3D visualization.

A mesh (and by extension the generated structured 3D model) may represent products in various and unlimited industrial fields, including: aerospace, architecture, construction, consumer goods, high-tech devices, industrial equipment, transportation, marine, and/or offshore oil/gas production or transportation. The generated structured 3D model may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round) and/or standard surfacing features (e.g. sweep, blend, loft, fill, deform, and/or smoothing).

Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (e.g. a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus, allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled object into elements which physical behaviors can be computed and simulated through equations. Such CAE solutions are provided by Dassault Systèmes under the trademark SIMULIA®. Another growing CAE technique involves the modeling and analysis of complex systems composed a plurality component from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 2:
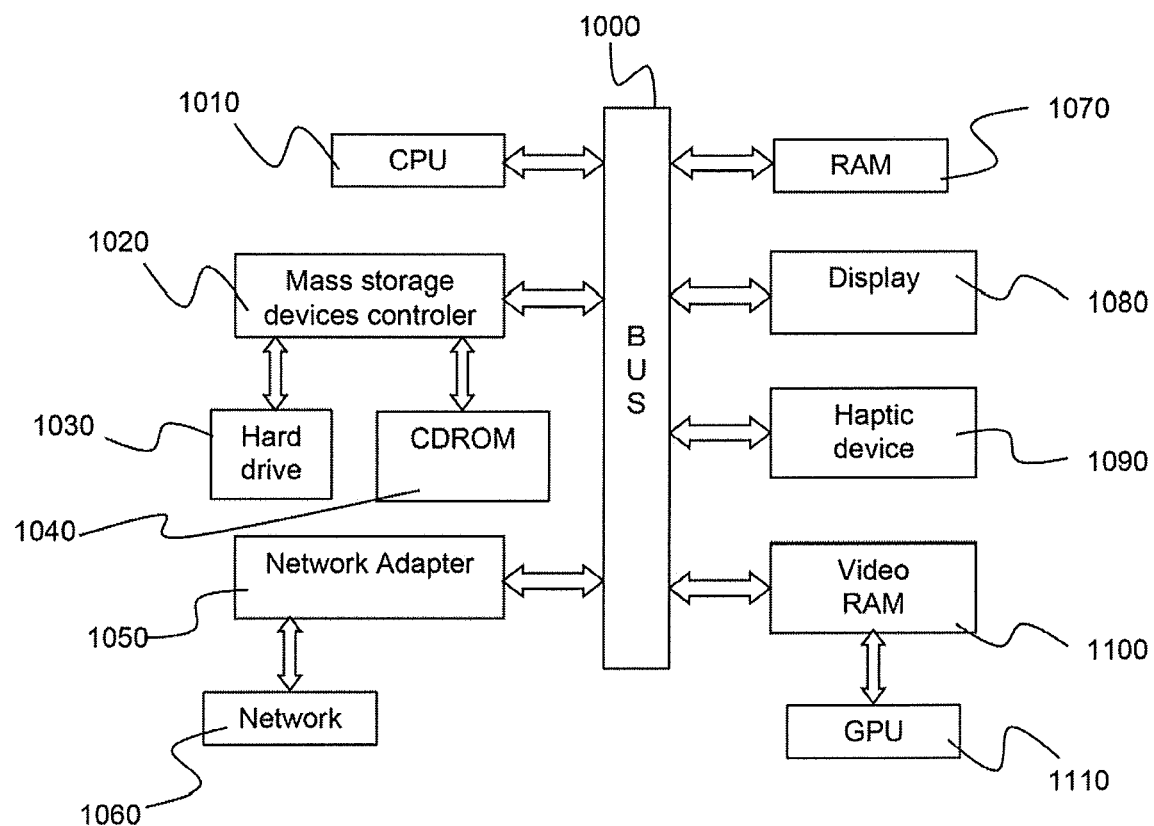
FIG. 2 shows an example of the system.

FIG. 2 shows an example of a system for performing the method. The system of the example comprises a central processing unit (CPU) 1010 communicatively coupled to a memory, e.g. a random-access memory (RAM) 1070. In this example, the CPU and the memory communicate through an internal communication BUS 1000. The client computer may further comprise further a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively, or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Extracting a feature tree from a mesh" is at least part of a process of elaborating a 3D modeled object. Thus, the method may comprise creating the mesh from scratch. The method may be included in a manufacturing process, which may comprise, after performing the method, producing a new 3D modeled object from the generated structured 3D model. A new 3D modeled object represents a physical product. In any case, the mesh in input of the method and the generated structured 3D model may represent a manufacturing object that is a product, such as a part, or an assembly of parts. Because the method allows the design of the modeled object from a raw mesh, the method also improves the manufacturing of a product and thus increases productivity of the manufacturing process.

A feature tree is a hierarchical organization that contains the history of solid operations performed on three-dimensional (3D) solid model. Each solid operation is defined as a feature on the solid. The extrude/revolve operation that creates a solid from a sketch (and the direction/length/angle parameters) is also a feature of the feature tree. An operation is a Boolean operation such as an add operation or a remove operation. The solid used for applying the Boolean operation is typically obtained from a sketch on which an extrusion operation is applied. In an example, the feature tree is a CSG (Constructive solid geometry) feature tree. CSG modeling is a well-known technique used in solid modeling that comprises using Boolean operations for combining simple objects in order to generate complex objects. The simplest solid objects used for the representation are called primitives that have simple shape such as cuboids, cylinders, prisms, pyramids, spheres, cones.

As known from the field of CAD, a feature tree is an editable data structure which comprises data representing a tree arrangement of geometrical operations applied to leaf geometrical shapes. Each leaf node of the feature tree arrangement represents a respective leaf geometrical shape, and each non-leaf node of the tree arrangement represents a respective geometrical operation, also called "feature", to be applied to its child node(s). Applying the tree arrangement of geometrical operations to the leaf geometrical shapes thus amounts to starting with the leaf geometrical shapes, and successively applying the geometrical operation of each non-leaf node following the tree arrangement. The 3D shape represented by the editable feature tree corresponds to the result of the root node(s) of the editable feature tree.

The leaf geometrical shapes may be of any type. The leaf geometrical shapes may for example each comprise (e.g. consist of) a respective 3D shape, such as a respective 3D solid. The geometrical operations may be of any type. In examples, the geometrical operations are all of a same type, for example all the addition or remove operation.

Edition of a leaf geometrical shape or of a geometrical operation may be performed by a user in any manner known from the field of CAD, such as comprising selection of at least one parameter thereof having a current parameter value and modification of said parameter value. Such edition presents ergonomics characteristics compared to edition of a discrete geometrical representation such as a raw mesh. In particular, an editable feature tree may comprise a number of leaf geometrical shapes lower than the number of discrete geometrical entities of an input mesh by a factor higher than 5 (e.g. higher than or 10), and/or a number of leaf geometrical shapes lower than 100 (e.g. lower than 50). Each leaf geometrical shape may be defined by a number of parameters lower than 20 (e.g. lower than 10). The editable feature tree thus represents the 3D shape in a more compact and organized manner compared to the discrete geometrical representation. Also, as known from the field of CAD, acting on a single parameter of the editable feature tree may present a global impact, while in the case of a discrete geometrical representation acting on a single geometrical entity only presents a local impact. For example, any editable feature tree herein may be configured for scaling up a (e.g. curved, for example cylindrical) part or a whole of the 3D shape by modifying a number of parameter values inferior to 5 (e.g. inferior to 3), as opposed to moving/increasing a high number of mesh triangles. In addition, an editable feature tree is semantically more meaningful to a user than a discrete geometrical representation.

Referring back to FIG. 19, it is now discussed an example of the method. At S100, a mesh is provided. Characteristics of the mesh have been discussed in reference to FIG. 1. The mesh comprises vertices, edges, and faces that use polygonal representation, including triangles and quadrilaterals, to define a 3D shape or at least a portion of a 3D shape. The 3D shape represents a solid object. The 3D shape represents a product in various and unlimited industrial fields, including, but not limited to, aerospace, architecture, construction, consumer goods, high-tech devices, industrial equipment, transportation, marine, and/or offshore oil/gas production or transportation.

Each face of the provided mesh comprises a normal. The normal of a face is a direction that is perpendicular to the face, as known in the art. In examples, the normal may be a vertex normal.

Each face of the provided mesh comprises principal curvature values. The principal curvature values at a given point of the face are the eigenvalues of the shape operator at the point, as known in the art. The principal curvature values measure how the surface bends by different amounts in different directions at that point. The maximum and minimum curvature values for the face are called the principal curvature values of the face.

Figure 6:
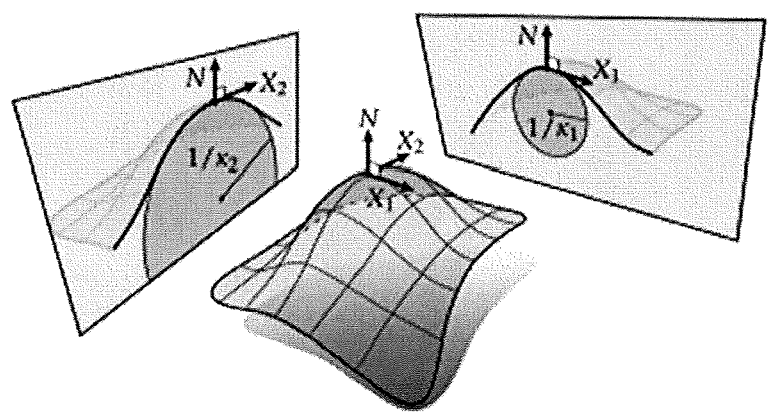
FIG. 6 shows an example of a representation of curvature.

FIG. 6 (extracted from "Discrete differential geometry: an applied introduction", K. Crane) is a generalized representation of a curvature at a given point of a surface that is located at the origin of the reference (N, X1, X2). Axis N represents the normal to the surface at the said given point, X1 and X2 are the directions for which the minimum and maximum curvature values are computed in this example.

Figure 4:
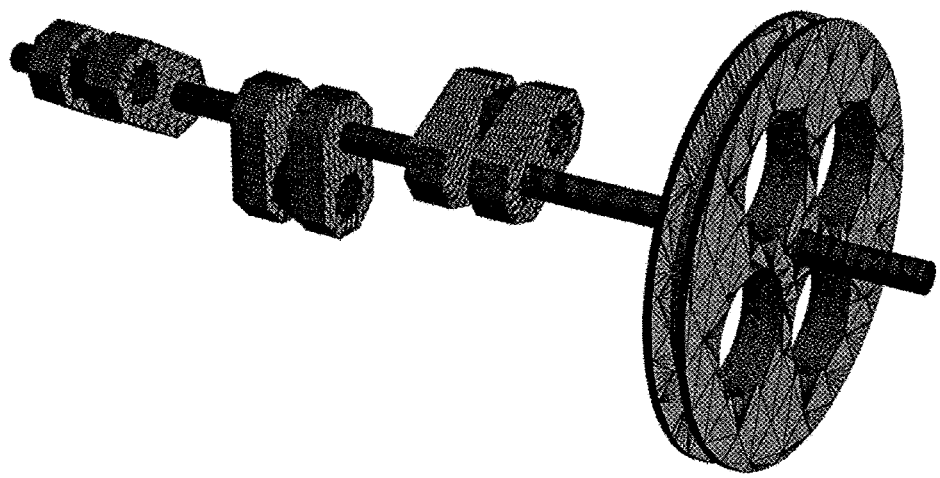
FIG. 4 shows a screenshot of an example of a raw mesh.

In examples, the provided mesh may be a raw mesh when the polygonal representations are not of similar dimensions and well equilibrated. For instance, the raw mesh may comprise skinny triangles, or may be non-manifold, or may have a constant normal orientation. The term raw mesh also applies when the information regarding the normal and the principal curvature values are not present or partially present. More generally, the present method behaves correctly and produces useful results (even if sometime partial) on meshes that are valid representations of 3D solids, e.g. the 3D solids may form a closed and orientable manifold surface with no auto intersections. The method also produces interesting results with meshes that are not closed. FIG. 4 illustrates an example of a raw mesh with triangles as polygonal representations. The raw mesh has been obtained This triangular raw mesh is not particularly clean as it has T-Junctions; that is, the mesh comprises spots where two polygons meet along the edge of another polygon. In addition, no information regarding the normals and the principal curvature values is available.

Figure 5:
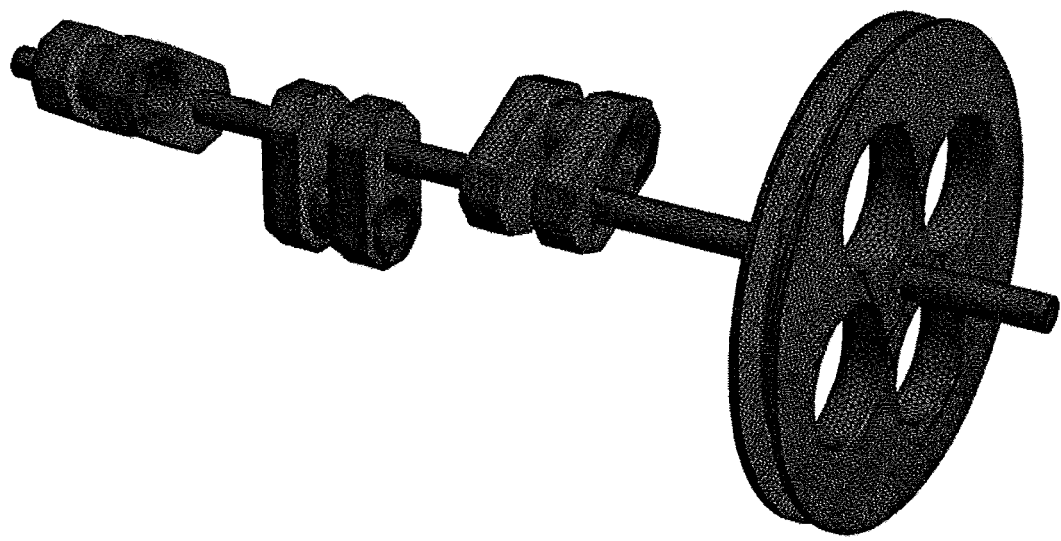
FIG. 5 shows a screenshot of an example of the remeshing of the raw mesh of FIG. 4.

In examples, the method may further comprise remeshing the provided mesh. This allows improvement in the quality of the mesh, namely the faces are of similar dimensions and well equilibrated, e.g. there are no skinny triangles. There are a lot of available methods, e.g. variational approaches may tend to produce well behaved meshes for the present method. FIG. 5 shows an example of a resulting mesh after a remeshing operation carried out on the raw mesh of FIG. 4.

In addition, remeshing a raw mesh improves the evaluation of the principal curvature values. Indeed, curvature can be evaluated on discrete 3D representations like triangular meshes for example using procedure like cotangent one, and most of these procedures tend to provide better results on meshes in which the faces (typically triangles) are similar and well equilibrated.

In examples, an evaluation of the principal curvature values on discrete geometries (the faces of the remeshed mesh) is performed with any known method. Normals may be evaluated at the same time, or before or after the evaluation of the principal curvature values.

Figure 7:
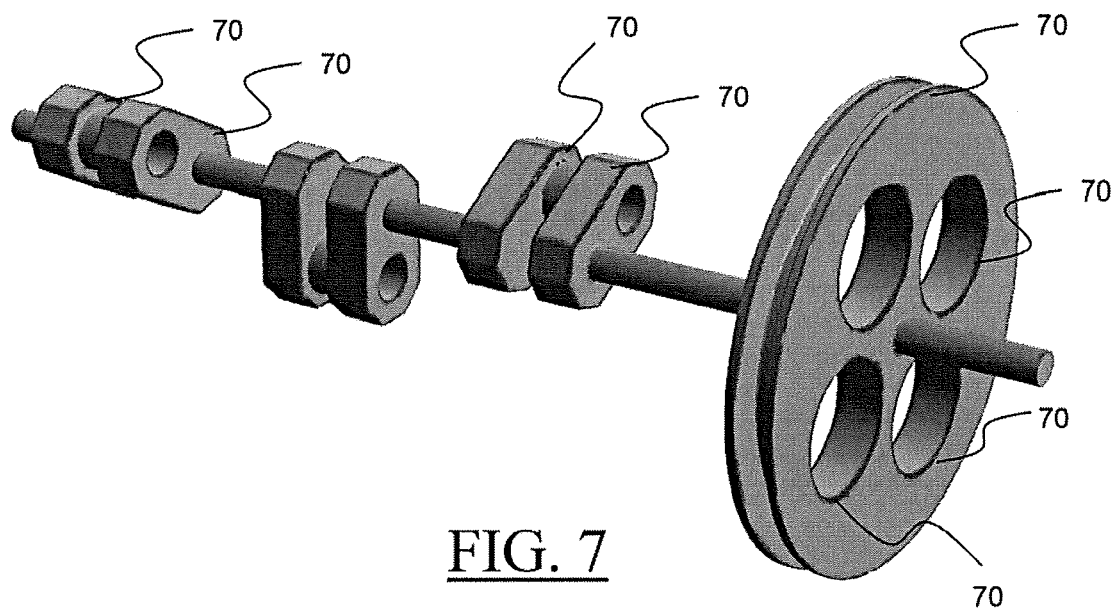
FIGS. 7 and 8 show screenshots of principal curvatures of the mesh of FIG. 5.
Figure 8:
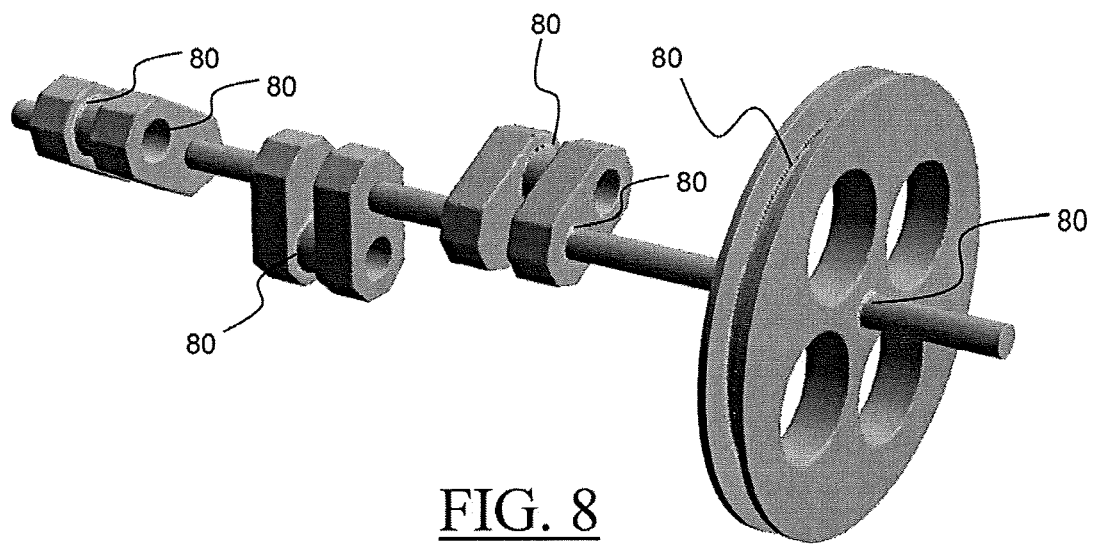

FIG. 7 and FIG. 8 shows maximum, respectively minimum, curvature values 70, respectively 80, identified (computed) for the mesh of FIG. 5.

It is assumed that the provided mesh correctly represents the boundary of a volume and thus contains orientation information that is consistent with respect to that volume.

Back to FIG. 19, a geometric and adjacency graph of the provided mesh is computed (S110). The graph provides a representation of a structured 3D model of the provided mesh. The graph is the result of an analysis of the provided mesh and provides, as a result of this analysis:
  a set of nodes, where each node of the graph represents one region of the mesh and comprises a primitive type and parameters of the region;
  each connection between two nodes is an intersection between the surfaces of the two regions represented by the two connected nodes.

A region of the mesh is a set faces of the provided mesh. Thus, a region forms a delimited surface of the mesh. Each node of the graph is associated with a primitive type. A primitive is a building block from which other shapes can be built. Primitives are commonly used in 3D modeling for building a 3D modeled object. For instance, a 2D polygon (e.g. a square, a rectangle) is a primitive that can be extruded in order to form a 3D volume (e.g. a square pad or a rectangular pad). A primitive can be, but is not limited to, a plane, a cylinder, a sphere, a pyramid, a cone, a quadric, a ruled surface, a tori . . . . A set of primitives allows describing an industrial product, e.g. the one represented by the mesh.

In addition, each node of the graph comprises parameters of the primitive. The parameters of a primitive determine the characteristics of the primitive from which the primitive can be instantiated. For example, as known in the art:
  the parameters of a primitive plane are the normal to the plane and a point lying on the plane;
  the parameters of a primitive sphere are the center and the radius;
  the parameters of a primitive cylinder are the direction of the axis, the height of the cylinder, the center and the radius of the circle;
  the parameters of a primitive cone are the axis direction, the height of the cone, the center and the radius of the cone base;
  the parameters of a primitive torus are the direction vector, the center, the radius for the great circle and the radius for the small circle.

Thus, each node is associated with a "standard" geometrical shape (the primitive) and parameters with which the "standard" geometrical shape can be instantiated. Each parameter comprises one or more parameters values that are used for instantiating the primitive. For the sake of simplicity, the terms "parameter" and "parameters values" are synonyms.

The graph also comprises the connection between two nodes or a pair of nodes. A connection represents an intersection between the respective surfaces of the two regions, each represented by one of the two connected nodes. An intersection between two regions is also referred to as surface-to-surface intersection (SSI) where the surfaces are those of the two regions. When two surfaces intersect, the result may be a set of isolated points, a set of curves, or any combination of these cases.

The intersection(s) of a region with other region(s) bounds the region. The intersections form at least one intersection loop.

The term "loop" means that an intersection forms a closed curve within itself or that two or more intersections form a closed curve within itself. Thus, an intersection loop for a region may result of the intersection of the region with one other region, e.g. a plane is intersected by a cylinder; or an intersection loop for a region may result of the intersection of the region with two or more regions, e.g. a face of a cube intersects four faces.

The regions being a set of faces of the mesh, an intersection between two regions comprises interconnected edges of faces (a connected sequence of edges) that belong both to the regions forming an intersection. Hence, an intersection is a polyline of common edges of faces of two regions, and therefore an intersection loop is also a polyline comprising common edges of faces of two or more regions that delimit the surface of the region.

The connections of each node are ordered and form an ordered list of intersections that represents an intersection loop of the said each node. Thus, the regions intersecting a given region are identified and ranked according to a direction of travel on the loop of the said given region. In the event the node comprises two or more intersection loops, an ordered list of connections is computed for each loop.

An intersections loop can be an outer intersection loop or an inner intersection loop, as known in the art. Outer and inner intersection loops thus represent the outer and inner boundaries of each node, that is, boundaries of regions of the provided mesh. In an example, for a region that could be flatten and projected to a place, the outer loop would be the one that contains the other loops.

The convexities and/or concavities of the intersections between a surface and its adjacent surfaces are collected and stored in the graph, for a connection. This can be performed for each edge of the intersection. Alternatively, this can be performed for the set of edges forming the intersection—the polyline that is created by the edges forming the intersection—: a global convexity and/or concavity is collected and stored for an intersection. It is to be understood that only the convexity or the concavity can be stored with the graph.

The mesh analysis generates a geometric and adjacency graph of the provided mesh. The geometric and adjacency graph provides identified primitive types of the surfaces on the mesh (the regions) and their parameters, plus the adjacency graph between the surfaces, the inner and outer boundary oriented loops of each surface, the adjacent surfaces for each loop of each surface and the respective convexities between a surface and its adjacent surfaces.

Figure 20:
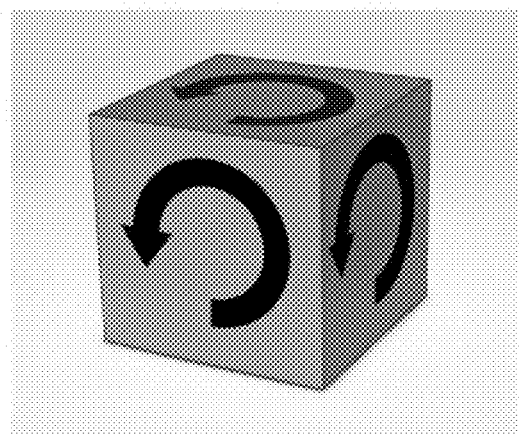
FIG. 20 is an example of adjacency information and oriented loops of intersections.

FIG. 20 is an example of adjacency information and oriented loops of intersections that can be retrieved from a graph obtained after analyzing the mesh of this cube. As already mentioned, the provided mesh correctly represents the boundary of a volume and thus contains orientation information that is consistent with respect to that volume. The mesh has the shape of a cube. Each plane is adjacent to four other ordered perpendicular planes, and, for each plane, all four edges are convex. For facilitating the analysis of the graph, the adjacent surfaces are ordered in winding direction relative to the matter side of the surface.

Referring now to FIGS. 1 to 18, it is now discussed example for computing S110 a geometric and adjacency graph of the provided mesh.

Figure 1:
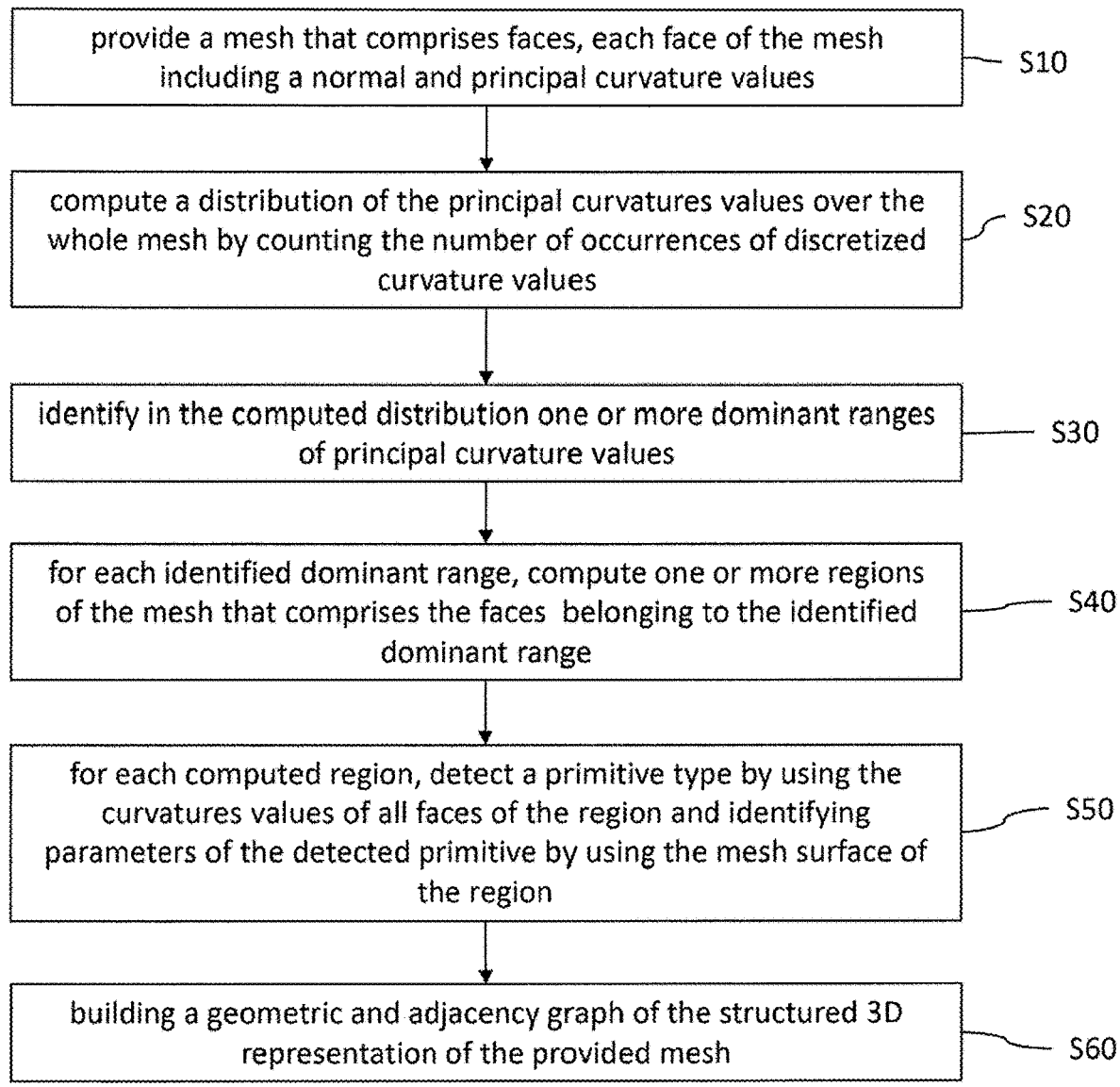
FIG. 1 shows a flowchart of an example of a method for obtaining a structured 3D representation of a mesh.

Back to FIG. 1, a distribution of the principal curvatures values over the whole mesh is computed (S20). The distribution is computed by discretizing the principal curvature values and the distributions are made by counting the number of occurrences of specific values. A link between each curvature value of the distribution and its corresponding face is kept—the corresponding face is the face on which the said each curvature value has been obtained (or computed).

Each entry in the distribution contains the count of the occurrences of principal curvature values within an interval of values of the principal curvature values. An interval of principal curvature values is also referred to as a range of principal curvature values. It is to be understood that all intervals of values (that is, all the ranges) comprise all the principal curvature values of the faces of the mesh. In examples, a Gaussian may be applied on the distributions for noise reduction. In practice and for the sake of visualizing the histograms of the distributions only (for instance on FIGS. 9 and 10), the intervals of principal curvature values may be identical; said otherwise, the discretization of the values and the range of the values over which the distribution extends are forced to be the same for the two principal curvatures distributions.

In an example, the number of ranges is fixed for the discretization and may be chosen by the user. Principal curvatures values are accumulated over the whole mesh.

In another example, the number of ranges may be adapted according to a maximum number of occurrences for each range: indeed, the number of occurrence counts may vary a lot from one mesh to another. In the end these exact counts are important relative to others as they serve to identify interesting ranges of principal curvature values, but one isolated count does not have much importance. The number of occurrences in a range may be divided by the number of faces of the mesh, thus the number of occurrences for each range can be interpreted as a percentage.

The computing of the distribution is made as known in the art.

In examples, the computation of the distribution may further comprise a Gaussian kernel is applied to the resulting distributions to get rid of some of the fluctuations in values.

Figure 9:
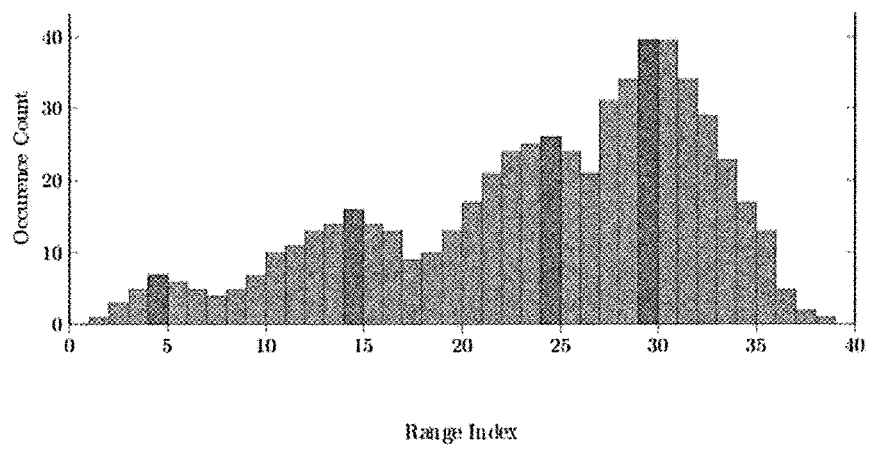
FIGS. 9 and 10 show examples of principal curvature value distributions of the mesh of FIG. 5.

FIG. 9 is an illustration of an example of a distribution of the principal curvature values of the faces of a mesh. In this example, the distribution is represented with a histogram. Here, the principal curvature values are between −2.0 and 2.0 and the distribution comprises 40 ranges of values. Signed values of the principal curvature values are taken for computing the distribution. The principal curvature values might be discretized with more ranges in the histogram of FIG. 9, for example 100 ranges. In this example, the curvature values have been forced to be discretized in 40 ranges.

Referring back to FIG. 1, S20, the principal curvature value of each face may comprise a minimum curvature value and a maximum curvature value. Hence, instead of computing a distribution with absolute values as discussed in reference to FIG. 9, the computation may comprise the computing of two distributions, respectively a first distribution of the minimum curvature values over the whole mesh by counting the number of occurrences of discretized curvature values and a second distribution of the maximum curvature values by classifying the maximum curvature values by their number of occurrences over the whole mesh by counting the number of occurrences of discretized curvature values.

It is to be understood that the examples discussed in reference to the general case where the distribution is computed by counting the number of occurrences of discretized curvature values apply to the examples where the first and second distributions are computed.

Figure 10:
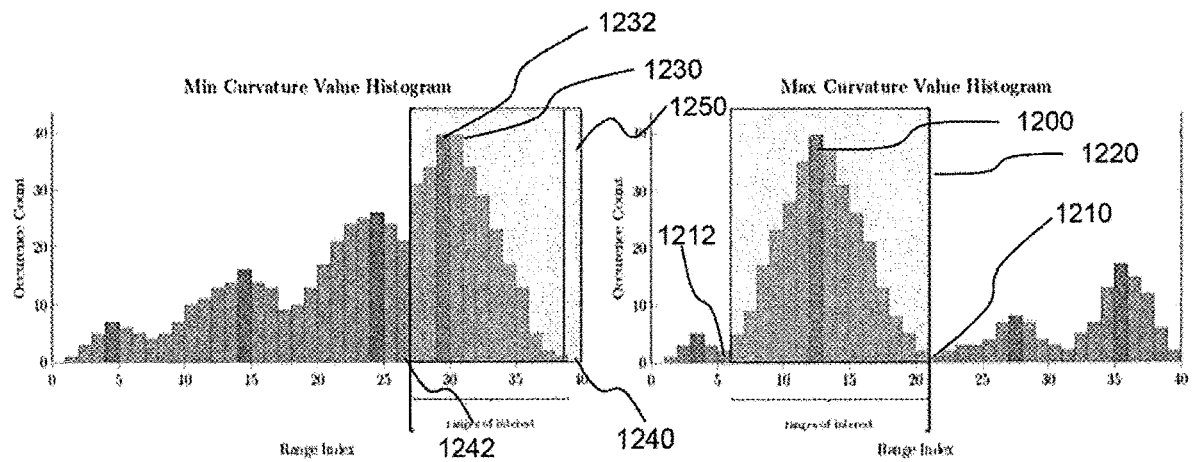

FIG. 10 is an illustration of an example of two computed distributions for a same mesh; the distribution on the left has been computed for the minimal curvature values of the faces of the mesh and the distribution on the right has been computed for the maximum curvature values of the faces of the mesh.

Back to FIG. 1, at S30, the method further comprises identifying in the computed distribution one or more dominant ranges of principal curvature values. A dominant range is a range representing a number of occurrences that is larger than those of other ranges. A dominant range may be dominant over the complete distribution. Alternatively, a dominant range may be a locally dominant; it is referred to as local dominant range. A local dominant range is a range with a number of occurrences that is larger than those of ranges among a given number of successive ranges on the distribution.

In the examples where two distributions are computed, a dominant range is identified on each of the two distributions.

In examples, the identification of a dominant range of principal curvature values may be performed upon determination of a local maximum of the distribution that is between two successive local minima of the distribution. The "local maximum" and the "local minimum" are local extrema in accordance with the mathematical definition. "Successive local minima" means that no further local minimum is between the two local minima. The ranges that are comprised between the two local minima, thus including the local maximum, form the dominant range. Therefore, the faces with discretized curvature values comprised between the two successive local minima belong to the dominant range, and the faces that belong to the two successive local minima do not belong the dominant range. The faces that belong to the two successive local minima are the most likely to belong or to be close to the edges of the primitive, while the faces that belong to the identified dominant range are the most likely to form a primitive.

Referring now to FIG. 10, an example of the identification of a dominant range of principal curvature values from a local maximum and two successive local minima is represented. The ranges represented in dark grey are local maxima. The right part of the figure, which corresponds to the distribution of the maximum curvature values of the faces of the mesh, is now discussed. The local maximum 1200 has been identified. This local maximum is surrounded by two local minima 1210, 1212 that are successive local minima as no further local minimum is comprised in the ranges between 1210 and 1212. The rectangular shape 1220 covers the ranges that form the identified dominant range. It is to be understood that three further dominant range can be identified on the right part of FIG. 10. The left part of the figure, which correspond to the distribution of the minimum curvature values of the faces of the mesh, is now discussed. Two successive local maxima 1230, 1332 have been identified. They are surrounded by two local minimum 1240, 1242 that are successive local minima. Interestingly, the range 1240 is an empty one as no faces has a minimal curvature value that is covered by this range. This empty range 1240 is a local minimum and in addition it is the last range of the distribution; for these reasons is represented as belonging to the dominant range 1250. It is to be understood that if the range 1240 would be located between two local maxima, it would not be represented as belonging to an identified dominant range.

In examples, the identification of the one or more dominant ranges on the distribution is performed without iterating, that is, all the dominant ranges are identified in the distribution in a row. The computation costs for the identification of the dominant ranges are thus low. In examples there are two distributions, the identification is similarly performed on both distributions in a row.

In examples, the identification of the one or more dominant ranges on the distribution performed upon determination of a local maximum of the distribution that is between two successive local minima of the distribution is repeated while the number of occurrences for a local maximum is equal and/or above a predetermined value, e.g. the predetermined value may be a number of occurrences that is equal to 1. The number of primitives' types (for example, plane, cylinder, ruled surfaces . . . ) being limited, the number of iterations does not need to exceed the number of primitives' type. Before each repetition, the faces previously identified as belonging to a dominant range are discarded, and the distribution is recomputed. Thus, the former identified two successive local minima of the distribution belong to the new distribution. Alternatively, all the dominant range may be identified in a row. Interestingly, the former local minima may contribute to a newly identified dominant range; this means that the faces that were previously considered as having the potential to belong or to be close to the edges of a primitive, may in a next identification of a new dominant range be part of a primitive. The new distribution may comprise a same number of ranges. The identification of each dominant range allows deriving of an interesting range of values in which individual faces are part of a surface that might be associated with an interesting primitive. In fact, the identified range of dominant values allows decision if each face is a face of a dominant primitive type or not. Clearly the process may be repeated on the remaining facets that have been discarded during the first pass (that is, those that do not belong to the previously identified dominant range(s)), leading to other distributions of values, identification of faces associated with another primitive types and so on. In examples there are two distributions (one for minimum curvatures values and one for maximum curvature values), this iterative identification is similarly performed on both distributions, e.g. concomitantly.

Thus, the determination of the dominant ranges allows to identify a first set of faces of the mesh that are likely to belong or to be close to the edges of a surface of primitive, and a second set of faces (a set of faces for each dominant range) where each set will form a region of a dominant primitive type.

It is worth noting that the method according to the embodiments has a different approach from the known prior art, such as Bénière et al. previously discussed. In the known prior art, sub meshes are iteratively processed until a point is reached where it is possible to identified or know how to deal with each part. On the contrary, the method can be stopped early when achieving something similar to defeaturing by not considering the areas outside of the dominant ranges associated with primitive types. Defeaturing means removing non-essential details from a CAD model, as known in the art.

Figure 11:
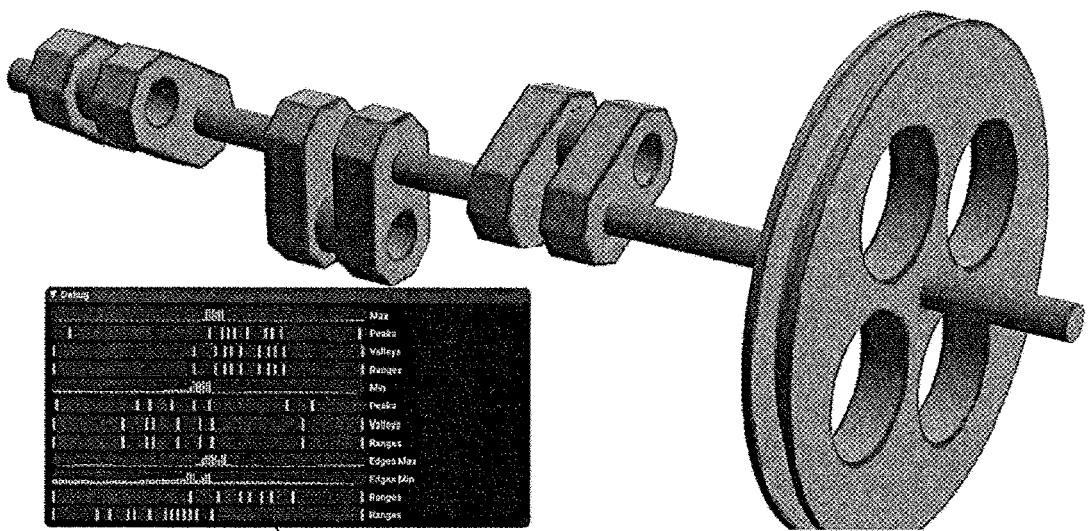
FIG. 11 shows a screenshot of curvature value range of interest of the mesh of FIG. 5.

FIG. 11 is a screenshot that shows the maximum curvatures of the mesh from FIG. 5 along with histograms—in the debug window 110—showing the distributions of min and max curvature values along with the ranges of values that have been built.

Back to FIG. 1, one or more regions of the mesh are computed (S40) for each identified dominant range. Each computed region thus comprises faces belonging to the corresponding identified dominant range. A region of the mesh is thus a set faces of the provided mesh.

Figure 12:
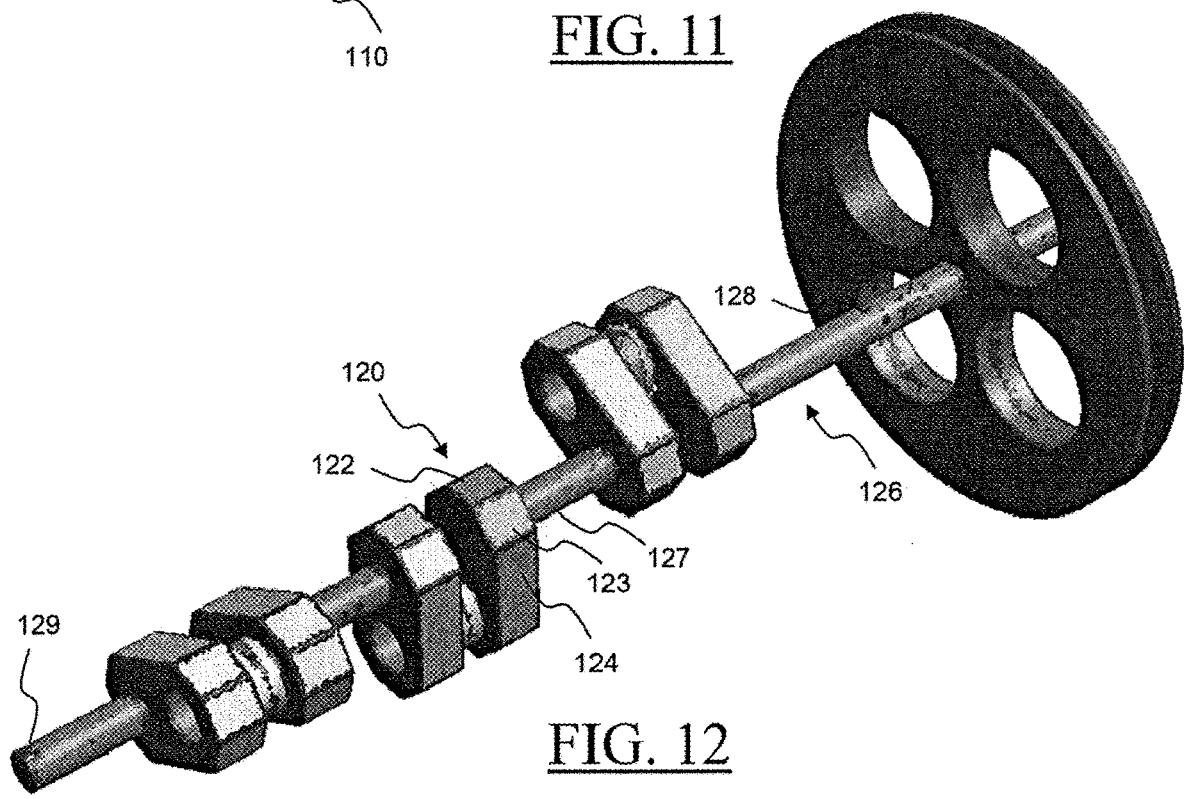
FIG. 12 shows a screenshot of regions of uniform curvature of the mesh of FIG. 5.

Thus, once one or more interesting range of curvature values have been identified, the faces are classified based on where they are part of these dominant ranges at one iteration of the method. FIG. 12 is a screenshot of the regions of uniform curvatures that have been obtained as a result S40 on the mesh of FIG. 5. The regions 122, 123, 124 are likely to match with a specific primitive surface type 120. The regions 125, 127, 128 and 129 match with another primitive surface type (here a cylinder). These regions are all part of a primitive surface of a rod 126 but at this step of the method they are seen as separated regions. One also notices that most of the regions shown on FIG. 12 do not have a clear intersection with their neighbor, for instance between 122-123 and 123-124.

In examples, a region growing is applied on each computed region to aggregate the faces not already assigned to one of the computed regions. The faces not already assigned to a computed region are those previously not attributed to one of the identified dominant ranges. The region growing can be applied successively on each region, or simultaneously on two or more or on all computed regions. The region growing improves the quality of the intersections between regions of the mesh: indeed, the region growing aims at aggregating all faces not already assigned to a computed region. These faces are typically those that were not identified as belonging to a dominant region. The region growing contributes to creating regions that touch each other.

In examples, the region growing (that is applied on each computed region) is guided by a distance between faces. The distance to be considered is the distance between a face of the region and a non-assigned face. The distance may be computed using any known method, e.g. Euclidian distance. A number of jumps from a triangle of the region to the non-assigned triangle may be used as an estimate of the distance, e.g. the distance on the surface. It is to be noted that when the faces of the mesh are well equilibrated (e.g. thanks to a remeshing), the number of jumps is an approximation (even very coarse) of a geodesic distance. Hence, geodesic distance or something similar may be used and is better than Euclidian distance between face centers for example.

In examples, the distance of region growing is weighted (one could also say modulated) by differences between the curvature values. Using the differences between curvature values for guiding the grow allows to maximize the number of relevant intersections for the region being grown with other regions. In addition, guiding the grow with curvatures values allows to grow faster in areas that are more likely to be part of a same primitive surface.

In examples, the distance value is linearly weighted by a constant and the differences between the curvature values. This improves the efficiency of the region growing.

In these examples of the region growing, a score is computed for the non-assigned face. Hence, and according to these examples, the score may be computed based one the distance between faces or based on the distance that is weighted by differences between the curvature values or based on the distance that is linearly weighted by a constant and the differences between the curvature values. When reaching a non-assigned face that might have already been associated with another primitive the new score for the current expansion is compared to the recorded score and the best score win. If it is the previous score that wins the expansion through this facet stops. If on the contrary the new score wins then it means that all the facets touching this facet (except the one, we are coming from for the new score) might have a better score than they had before and thus we keep spreading the same process to these neighbors . . . and so on. If an already associated face gets associated with a new region, all the neighbors of this already associated face are evaluated again, except the associated face. This mechanism has some similarities with a Dijkstra or A* except that the mechanism does not try to reach a specific objective and is not guided by a heuristic toward that objective.

A detailed example of a growing region algorithm is now discussed. The region growing is guided by the distance that is linearly weighted by a constant and the differences between the curvature values.

Although the principle is the one described above, at the implementation level the algorithm works in a way that is the mirror of that to simplify the implementation. Faces check what are the values coming from the neighbors.

The process is initiated as follow. One assigns a same first score (a same arbitrary large score) to the faces of a first set of faces, the first set of faces comprising the faces belonging to none of the computed regions. In addition, one assigns a same second score of zero for each face belonging to one of the computed regions. The first score is larger than the second score. Said otherwise, to initiate the process all triangles in a region are initialized with a zero cost and the region of which they are part of is recorded as the region giving them this zero score. All faces (e.g. triangles) that are not part of a region are given an infinitely high score and a 'no region' region is recorded on these faces as the region giving that score.

Then each face of the first set (the faces that are not yet part of a region and that must be processed) are tested. That is, all faces not assigned to a region are put in a queue of faces to be processed.

For each face to be processed (or face to be tested), neighbors of the faces are checked to see the scores that could be get through them. The neighbor of a face is face sharing an edge. Hence, for each adjacent regions of the face, a third score is computed based on a distance between the face and the adjacent region and on a difference in principal curvature values between the face and the adjacent region.

If there is no better score (that is, if the third score is larger than the first score), the process stops for the tested face and the tested face is put in a list of already processed faces. The region to which the score corresponds is also recorded. Alternatively, the region to which the score correspond will be recorded when the best score among the computed scores for the tested face has be determined.

If the score is equal to the score already assigned, then the process stops. The tested face is put in a list of already processed faces. The region to which the score corresponds is also recorded. Alternatively, the region to which the score correspond will be recorded when the best score among the computed scores for the tested face has be determined.

If there is a better score (that is, if the third score is smaller than the current score), the tested face is removed from the first set (the faces that are not yet part of a region and that must be processed), the process records the better score (that is, the process records the better score which becomes the new current face score) along with the region respective to that score for the tested face, and it puts back all neighbor faces of the tested face (except the face giving the new score) in the queue of faces to be processed. If eventually a neighbor face is the list of already processed faces, then it is removed from the list of already processed faces.

And when the list of faces to be processed is empty, the tested faces initially in the first set are regrouped with the region associated with the best third score they have.

This process will converge like a Dijkstra and ensure that each face that was not assigned to a region will record its best 'proximity' score and the associated region.

The region growing can be summarized as follow.

Initialize an arbitrarily large score for each 'edge' triangles (not assigned to a region) and specify that it is not associated with any region at this point.

Initialize all non 'edge' triangles already associated with a primitive with a score of zero and associate them with the primitive they are already part of.

Put all 'edge' triangles in a collection of triangles to be processed

While collection of triangles to be processed is not empty:
Get a triangle from that collection
If triangle is in already processed list:
Continue with next triangle in the collection of triangles to be processed
For each neighbor of that triangle:
    Compute that triangle potentially new score as if we were coming from that neighbor using the following formula the new score is the value that will be checked against the current best score of the face):

new_score=neighbor score constant_curvature_factor*(A+B)

where
constant_curvature_factor is a constant curvature factor;
A is the absolute value of the difference between the maximum curvature value of the selected face and the maximum curvature value of the face of the adjacent region;
B is the absolute value of the difference between the minimum curvature value of the selected face and the minimum curvature value of the face of the adjacent region.
If that new score is lower than that triangle current score:
    Set the new score
    Associate that triangle with the shape the neighbor is associated with
    Record the neighbor that we have used
If that triangle score value has been improved (by going through a specific neighbor):
Put back all that triangle neighbors, except the specific one through which we have an improved score, in the list of triangles to be processed and remove them from the already processed list
Add that triangle to the already processed list.

One reminds that the algorithm is applied after the identification of one or more dominant ranges of principal curvatures values (S30). The algorithm has thus in inputs one or more second sets of faces (the set of faces for each dominant range) where each set will form a region of a dominant primitive type, and the first set of faces that comprises faces that are likely to belong or to be close to the edges of a region.

When the second set of faces is empty, that is when all the faces have been associated with one of the computed regions of the mesh, the above-described test stops. FIG. 13 represents the mesh of FIG. 12 obtained after applying the region growing. One can notice that each region has now edges that are defined by interconnected edges of faces; the edges of the regions are thus polylines that delimit the surface of the region.

FIG. 14a (respectively FIG. 15a) is a screenshot of a mesh with regions before the growing region. FIG. 14b (respectively FIG. 15b) is a screenshot of the mesh of FIG. 14a (respectively FIG. 15b) after applying the region growing.

Referring back to FIG. 1, a primitive type is detected for each computed region (S50). A primitive is a building block from which other shapes can be built. Primitives are commonly used in 3D modeling for building a 3D modeled object. For instance, 2D polygon (e.g. a square, a rectangle) is a primitive that can be extruded in order to form a 3D volume (e.g. a square pad or a rectangular pad). A primitive can be, but is not limited to, a plane, a cylinder, a sphere, a pyramid, a cone, a quadric, a ruled surface, a torus . . . . A set of primitives allows describing an industrial product, e.g. the one represented by the mesh.

The detection of a primitive's type (one could also say the computation) relies on the curvature values of the faces of the region. The detection of a primitive's type by using the curvature values of the faces of the region is performed as known in the art. FIG. 16 illustrates the distribution of principle curvature values of the faces of a region that is a primitive of the type plane. FIG. 17 illustrates the distribution of principle curvature values of the faces of a region that is a primitive of the type cylinder. The distributions of FIGS. 16 and 17 may be templates of a respective type of primitive, and a comparison of template with the distribution of a region allows identifying the primitive of the region.

For each detected primitive, parameters of the detected primitives are computed based on the primitive type using the surface of the region (aka the triangles of the mesh associated with that region) and a least square optimization algorithm on the parameters may be applied. The parameters of a primitive determine the characteristics of the primitive from which the primitive can be instantiated. For instances, as known in the art:

the parameters of a primitive plane are the normal to the plane and a point lying on the plane;
the parameters of a primitive sphere are the center and the radius;
the parameters of a primitive cylinder are the direction of the axis, the height of the cylinder, the center and the radius of the bottom circle;
the parameters of a primitive cone are the axis direction, the height of the cone, the center and the radius of the cone base;
the parameters of a primitive torus are the direction vector, the center, the radius for the great circle and the radius for the small circle.

The detection of the parameters of a primitive is performed as known in the art. The parameters are computed using the surface of the region, that is, directly form the mesh. In examples, the identification of the parameters is performed by estimating the parameters with a least square optimization. The values of the parameters are optimized so that the exact surface that can be instantiated from them sticks at best to the portion of the mesh that is to be represented by this surface. Each parameter comprises one or more parameters values that are used for instantiating the primitive. For the sake of simplicity, the terms "parameter" and "parameters values" are synonyms.

In examples, and after the computing of the regions of the mesh, intersection loops between the regions are computed using the adjacencies of the triangles of the mesh. An intersection between two regions is also referred to as surface-to-surface intersection (SSI) where the surfaces are those of the two regions. When two surfaces intersect, the result may be a set of isolated points, a set of curves, or any combination of these cases.

The intersection loops between the regions form boundaries of the surfaces of the regions. The term "loop" means that an intersection forms a closed curve within itself or that two or more intersections form a closed curve within itself. Thus, an intersection loop for a region may result of the intersection of the region with one other regions, e.g. a plane is intersected by a cylinder; or an intersection loop for a region may result of the intersection of the region with two or more regions, e.g. a face of a cube intersects four faces. The regions being a set of faces of the mesh, an intersection between two regions comprises interconnected edges of faces (a connected sequence of edges) that belong both to the regions forming an intersection. Hence, an intersection is a polyline of common edges of faces of two regions, and therefore an intersection loop is also a polyline comprising common edges of faces of two or more regions that delimit the surface of the region.

In examples, the computation of intersection loops is performed for each region upon identification of all the intersection of the region with the other regions. Thus, the intersection loops are created from all the intersections of the region with the other regions. When the computation of the intersection loop is done, a polyline of the edges of faces of the region is built, as known in the art.

In examples, after the computation of intersection loops, and for each intersection loop, an ordered list of the regions that belong to the intersection loop is collected. Said otherwise, the regions in contact with a given region are identified and ranked according to a direction of travel on the loop of the said given region. The ordered list of intersections represents an intersection loop of a node of the adjacency and geometry graph. In the event the region comprises two or more intersection loops and thus the node needs to comprise several intersections, they are provided in a list with the first one that contains the others (the choice for cylinders is arbitrary).

In examples, concavity, convexity and position information for each edge of the intersection loop are collected. The computation of the concavity and convexity is performed as known in the art. In an example, once the various regions are touching each other, the outer and inner intersection loops are collected for each region. These are collected respecting the same rotation order evaluated for each triangle using predicates to cope with potential numeric issues that may be caused by floating point arithmetic. Such collection is discussed by Jonathan Richard Shewchuk, "Robust Adaptive Floating-Point Geometric Predicates", in Symposium on Computational Geometry 1996, pages 141-150. While collecting the intersections, concavity and convexity information for each edge of the faces of the region are computed and recorded, and vertices associated with the loop portions are also recorded. Alternatively, the edges forming the intersection loop could be recorded instead of the vertices. Concavity, convexity and position information of each edge of the intersection loop can be stored on the connection between two nodes the edge relates.

In examples, the concavity, convexity and position of the edges forming the intersection between two regions are collected. This concavity, convexity and position are no more those of each edge, but rather global concavity, convexity and position of a polyline that is created by the edges forming the intersection between two regions are collected. Then these are consolidated to be associated with the intersection so that it is possible to get concavity and convexity for each adjacency/intersection between two regions.

An intersections loop can be an outer intersection loop or an inner intersection loop, as known in the art. Outer and inner intersection loops thus represent the outer and inner boundaries of each node, that is, boundaries of regions of the provided mesh. In an example, for a region that could be flatten and projected to a place, the outer loop would be the one that contains the other loops.

Figure 18:
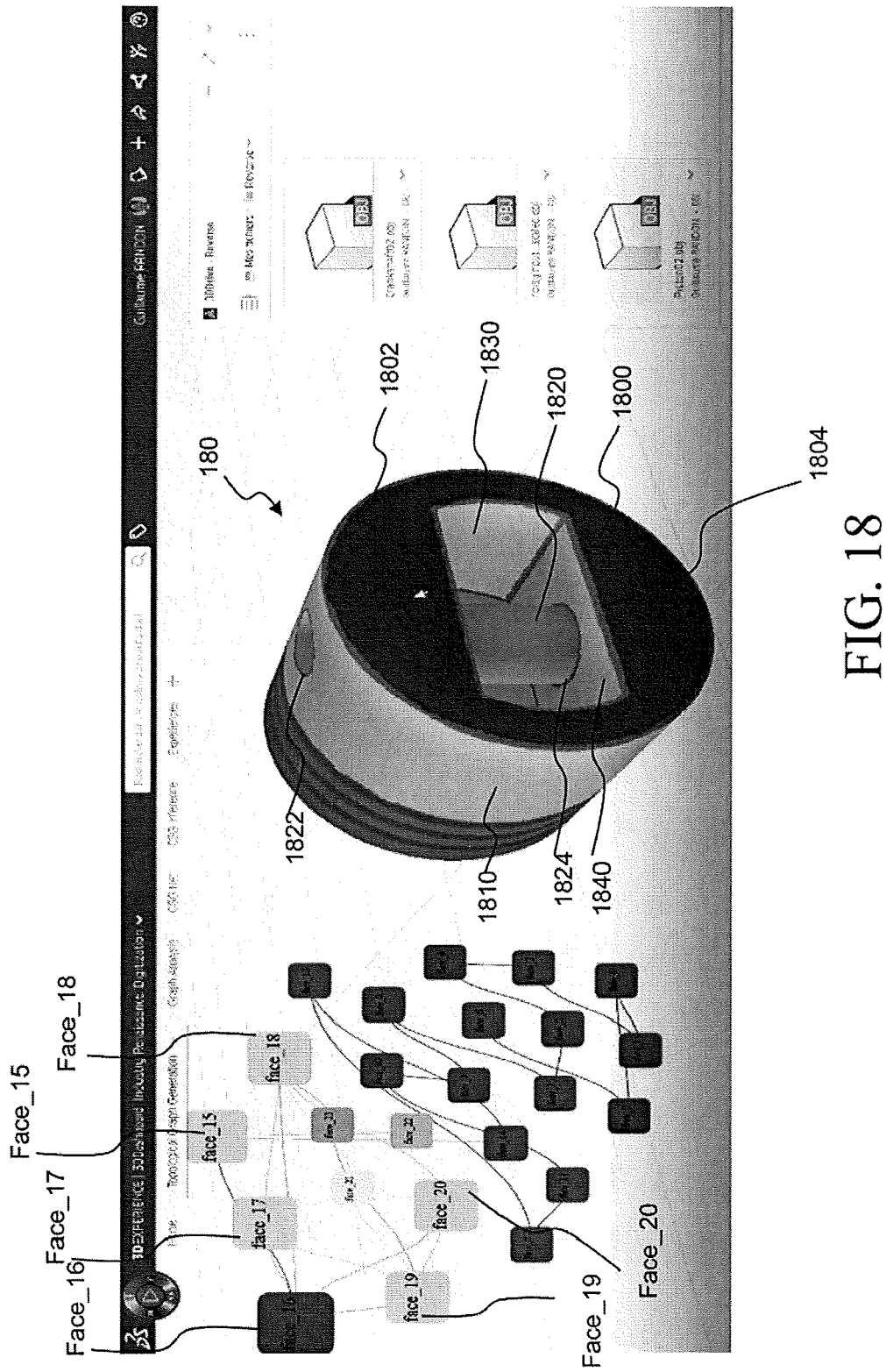
FIG. 18 is a screenshot of a representation of a structured three-dimensional (3D) model from a mesh.

Example of inner and outer intersections loops are represented on the picture (a screenshot) of FIG. 18 for the mesh of an object 180. Several regions (e.g. 1800, 1820, 1810, 1830, 1840 . . . ) have been computed. The region 1800 will be identified as a primitive of the type plane. The region 1800 has contact with the region 18010 that will be identified as a primitive of the type cylinder, and with four regions (only two 1830, 1840 of the four regions can be seen on this figure). An intersection loop 1802 has been computed between the region 1800 and the region 1810. Another intersection loop 1804 has been computed between the region 1800 and the four regions. More precisely, the intersection loop 1804 includes four intersections between the region 1800 and the four regions (e.g. 1830, 1840). The intersection loop 1802 bounds the regions 1800 and is an outer intersection loop. The surface bounds by the intersection loop 1804 is empty (that is, the intersection loop 1804 bounds no faces of the mesh, or no face of the region 1800 are in the delimited surface bounded by the intersection loop 1804), and thus the intersection loop 1804 is an inner intersection loop intersection. The loop 1802 is also an outer intersection loop of the region 1810. The intersection loops 1822 between the region 1810 and the region 1820 (that will be identified as a cylinder primitive) is an inner intersection loop for the region 1810 while it is an outer intersection loop for the region 1810. Similarly, the intersection loops 1824 between the region 1820 and the region 1840 (that will be identified as a primitive of the type plane) is an outer intersection loop for the region 1820 while it is an inner intersection loop for the region 1840. It is to be understood that this choice is arbitrary for the cylinder as there is an equivalent loop on the other side of the cylinder. Hence, when building the CSG tree several combinations might be tried out.

Collecting oriented loops of intersections, flagging them as inner or outer loop, keeping convexity information per intersection and positions of the intersection edges allow to directly exploit this information, e.g. to generate an exact solid feature tree without building a full exact B-Rep representation. Again, this is especially interesting in cases in which the information provided by the mesh analysis would have failed to rebuild a complete B-Rep. The present is thus more robust. Even if the obtained result may not reflect the full details of the original mesh, it can serve as a base for modeling operations and by extension to any usage one can make of traditional exact CAD models. For example, the user can use part of the generated structured three-dimensional (3D) model from a mesh result as an intermediary step only and edit any element through its parameters.

Back to FIG. 1, a geometric and adjacency graph of the provided mesh is built (S60). The graph provides a structured representation of the outputs of steps S10 to S50, and therefore a representation of a structured 3D model of the mesh generated with these steps. The graph comprises nodes and connections between node. Each node of the graph represents one of the computed regions (S40) and is associated with the primitive type identified for this region and the parameters identified for this region. Each connection between two nodes represents an intersection between the respective surfaces of the regions represented by the nodes.

The screenshot of FIG. 18 provides an example of the displaying of the representation of a structured 3D model of the mesh of the object 180 generated as using the outputs of the step S10 to S50. The node "face_16" represents the region 1800 and is associated with primitive type of the regions 1800 (a plane) and the parameters of the primitive. The region 1800 is in contact with five regions, as already discussed. The region 1810 is represented by node "face_15", the four regions (e.g. 1830, 1840 . . . ) are represented by nodes "face_16", "face_17", "face_18", "face_19". Five connections a displayed, one connection between the node "face_16" and the node "face_15" for representing the intersection 1802, and one connection between the between the node "face_16" and the node "face_15" (respectively "face_17", "face_18", "face_19") representing the intersections that form the intersection loop 1804.

In example, further collected information previously collected such as the intersections, the ordered list of regions forming an intersection loop, concavity and convexity information for each edge of the faces and/or the vertices associated with the loop portions are recorded together with the geometric and adjacency graph. "Recorded together" means that this information can be accessed or is associated with a node or a connection. For instance, referring now to FIG. 18, the ordered list of the four regions forming the intersection loop 1804 can be stored with the node "face_16", or the connections between the node "face_16" and the nodes "face_15", "face_17", "face_18", "face_19" can be ranked in accordance with the list.

In these examples, the generation has been shown for the case the complete surface of the mesh is processed. It is worth mentioning that the representation does not necessarily need to be complete, that is, the generation can only cover a part of the mesh. The generated structured 3D model is still useful, despite it does not resent exactly all the details of the original mesh.

Back to FIG. 19, at S120 and S130, a sketch is computed for each node of the graph. The computation of the sketches relies on identified planar loops from the graph. An example of the computation of the sketch of a node is now discussed.

For each node of the graph, a surface is instantiated (S120) based on the identified primitive type and parameters of the region that is represented by the node. This is performed as known in the art, e.g. by a CAD system.

Then, for each instantiated surface, one or more intersection loops are computed (S132). The computation is performed from the geometric and adjacency graph previously computed (S110) that comprises an ordered list of connections that was computed for each loop of a node. The ordered list of intersections provides the information for interconnecting the computed intersections, thus forming an intersection loop. One understands that the intersections and the intersections loops that are computed at S132 differ from those obtained during the analysis of the mesh (S10 to S60) as they are built starting from primitives that are not necessary identical to the regions of the mesh from which they were inferred: indeed, most of the primitives of the graph are approximations of the mesh. Hence, the computed intersections and intersections loops (S132) can be different from those identified during the analysis of the mesh, e.g. a closed loop identified in the mesh is no more closed as a result of S132. However, as the graph provides information regarding the adjacent surfaces for each loop of each surface and the respective convexities between a surface and its adjacent surfaces, it is possible to close an unclosed intersection loop of an instantiated surface.

Each instantiated surface comprises one outer intersection loop. In addition, an instantiated surface can possibly comprise one or more inner intersection loops. The computation for outer and inner intersections loops is performed the same way.

In the case of a circular sketch (i.e. the sketch plane has only one adjacent surface which is a cylinder, a cone or a sphere), this is sufficient to generate the sketch.

In all other cases, several loops may be computed from the intersections between the instantiated surface and its adjacent instantiated surfaces.

Figure 22:
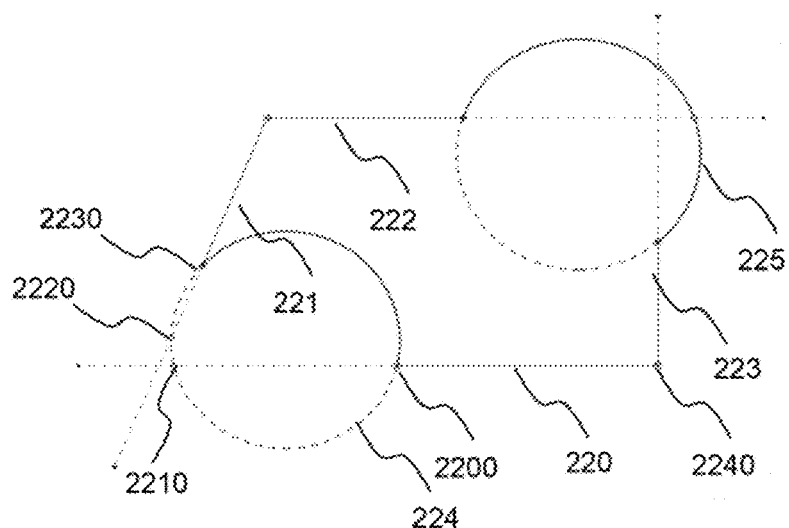
FIGS. 22 and 23 are examples of ambiguities resolved using vertices positions.
Figure 23:
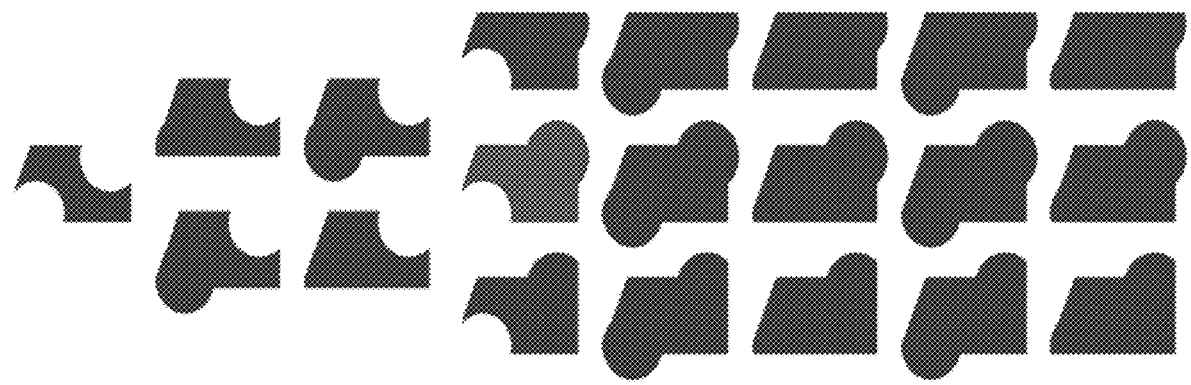

This is for instance illustrated on FIG. 22 that shows the intersections of four faces (220, 221, 222, 223) and two cylinders (224, 225) with an instantiated plane. In this example, the ordered list of connections is not sufficient for identifying one single loop formed by the intersections. FIG. 23 illustrates all the solutions that can be derived from the situation of FIG. 22. All these possibilities can be computed from the graph that provides adjacency between the surfaces, the adjacent surfaces for each loop of each surface, the respective convexities between a surface and its adjacent surfaces, and the inner and outer boundary oriented loops of each surface.

When several combinations of interconnections of the intersections can be defined, the following step may be performed in order to generate the sketch that is closest to the loop detected on the mesh.

First, the set of end points of the connected curves are computed. One understands the end points are computed between two intersections (on the instantiated surface) that are successive in the order list. Each of these end points is defined by the intersection of three surfaces, i.e. the sketch plane and the two adjacent surfaces that help define the two connected intersection curves in the sketch.

On FIG. 22, the intersection 220 intersects with the intersection 224 in accordance with the list of ordered intersections of the graph. The intersections 220 and 224 can be interconnected with two end points 2200 and 2210. A similar situation occurs with the curves 224 and 221 with the two end points 2220 and 2230.

Second, in order to identify the best solution, that is, in order to generate the sketch that is closest to the loop detected on the mesh, the end point that is closest to the mesh vertex and that belongs to the three surfaces is selected. Such selection is performed for each point of the loop that belongs to three surfaces.

Figure 24:
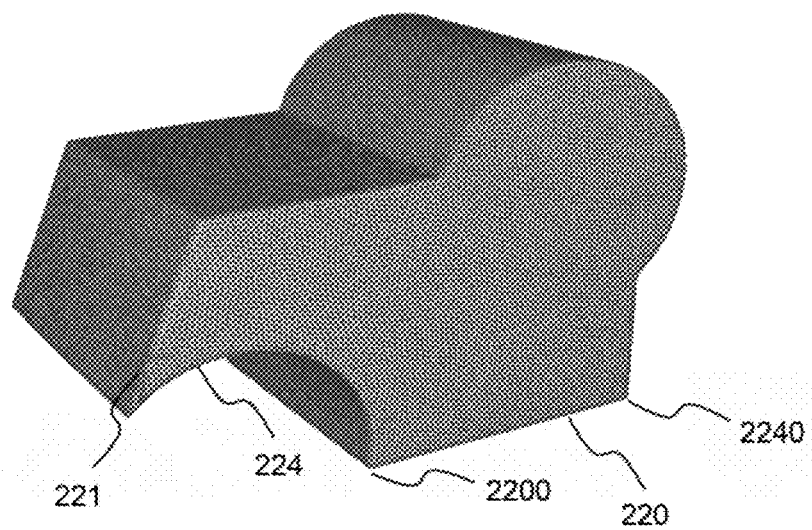
FIG. 24 is an example of a solid provided as input.

Back to FIG. 22, the end points 2200 and 2210 are obtained for the same intersection of three instantiated surfaces, and the end point 2200 is selected as it is the closest to the provided mesh. This is illustrated on FIG. 24 that shows the mesh related to FIG. 22. For the sake of clarity only, references of FIG. 22 have been reported on FIG. 24.

Once the endpoints have been tested and selected, the best combination of interconnections of the intersections is obtained, which is the one that generates the sketch that is closest to the loop detected on the mesh.

In examples, after the endpoints have been tested and selected, a selection may be performed of which arc of the intersection curve (except if it is an intersection line between two planes) is used. This is done by computing the midpoint of the arc and by comparing it with all interior points of the intersection curves that are found on the mesh.

Figure 21:
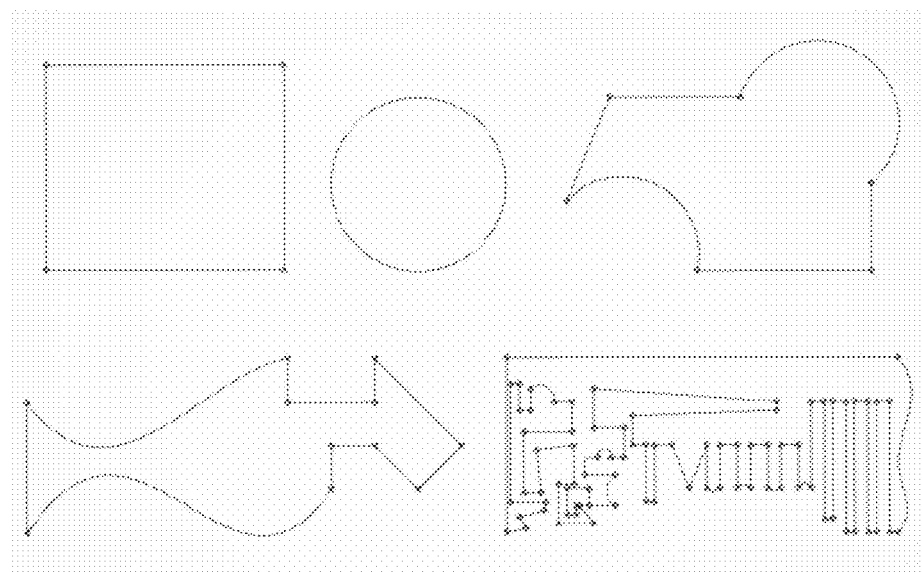
FIG. 21 is an example of sketches derived from loops.

Next, a sketch is computed (S134) from the instantiated surface using the outer intersection loop and possibly one or more sketches respectively from possibly one or more inner intersection loops of the instantiated surface. The term "sketch" means a 2D plane that is used for building a 3D volume upon extrusion of the 2D plane. The 2D plane is delimited by the set of interconnected curves, where the interconnected curves are the computed intersections forming a loop. FIG. 21 shows examples of sketches.

The output of S130 is a set of sketches.

Back to FIG. 19, a sweep operation is applied to each computed sketch (S140). A swept volume or solid is generated for each sketch.

In examples, the sweep operation may comprise computing a sweep direction and a sweep length. The sweep direction and the sweep length define the displacement of each point of the sketch in the 3D scene, as known in the art. The sweep direction and a sweep length may be computed from the intersections loops that are adjacent to the outer intersection loop. In the event the sketch comprises one or more inner intersection loops, the sweep direction and a sweep length may be computed from the intersections loops that are adjacent to the inner intersection loop(s) of the sketch.

Examples of the computation of a sweep direction and a sweep length are now discussed.

In an example, the computations are performed for each sketch and for each intersection loop of a sketch. The example is discussed in relation with FIG. 25 that illustrates the principles of the computation of a sweep direction and a sweep length.

Firstly, one or more sketch points are identified on the intersection loop. Sketch points are the former end points that were retained. Hence, a sketch point is a point that is common to the intersections loops that are adjacent to the intersection loop of the sketch. On FIG. 25, the sketch point 2240 connects the curves 223 and 220, each curve supporting an adjacent loop to the intersection loop of the sketch to extrude.

Secondly, a target point is identified for each sketch point. A target point is a point that is common to the intersections loops that are adjacent to the intersection loop of the sketch. There may be more than one common point (other than the current sketch point), in which case it is possible to select the closest one from the sketch point, or it is also possible to select the further from the sketch point, or it is possible to compute all possible lengths. On FIG. 25, the target point 2242 is the point that is common to the two adjacent intersection loops supported by the curves 223 and 220. It is to be understood that one sketch point is associated with one target point.

Thirdly, a vector is computed for each sketch point. The vector joins the sketch point to the target point. The vector has a direction and a norm. The direction of the vector is the direction of the sweep operation and the norm of the vector is the sweep length.

Hence, an individual displacement of each sketch point is obtained as a result of these steps as a vector is computed for each sketch point. It is to be understood that there as situations in which only one vector is computed, e.g. the sketch was the result of the intersection between a plane and a cylinder. It is to be understood that only one vector might be computed for a set of sketch points of a loop. Similarly, the number of sketch points for which a vector is computed might be smaller than the total number of sketch points on the loop.

In an example, a global sweep direction and a global sweep length may be computed for the situation where two or more vectors have been computed. Here global means that an identical sweep direction and sweep length are applied on each point of the intersection loop. The extrusion is thus more uniformly defined. In this example, the vectors are compared in order to determine whether they have a same direction. If this is the case, this means that a unique extrusion direction has been found. The comparison of the vector further allows determination if the surfaces of the intersections loops that are adjacent to currently tested intersection loop of the sketch are parallel to this same direction. This ensures that the extrusion will generate surfaces. If this is the case, and the two determinations being cumulative, the sweep operation is applied according to the unique global direction of the vectors.

In examples, no global sweep length is determined, and therefore the sweep length that is applied for each sketch point is the one that is associated with its vector.

In examples, further tests may be performed on the vectors in order to compute a global length of the extrusion. In an example, the smallest value among the norms of the vector is identified and serves as global length of the extrusion. In another example, the largest value among the norms of the vector is identified and serves as global length of the extrusion. In a further example, an average of the norms of the vectors is computed and serves as global length of the extrusion.

Figure 25:
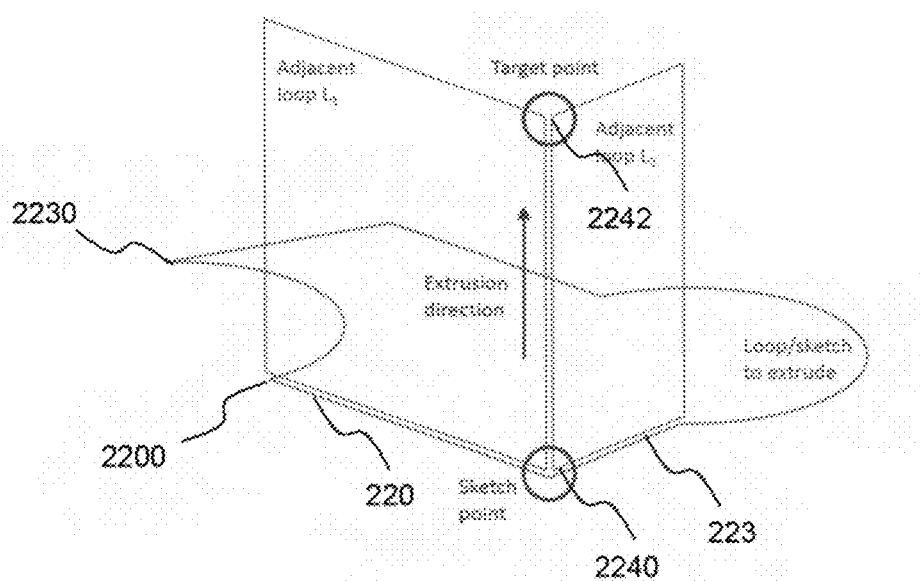
FIG. 25 illustrates an example of extrusion distance and direction from sketch points.
Figure 26:
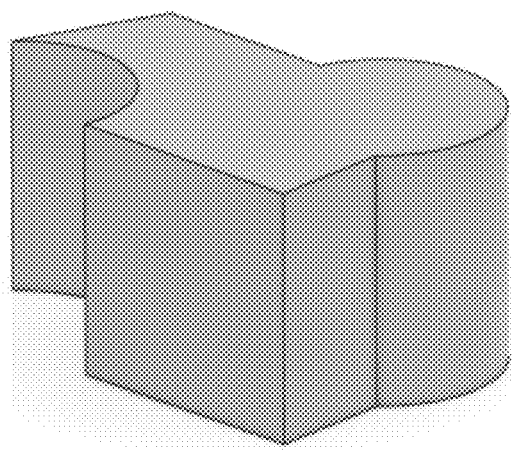
FIG. 26 illustrates an example of solid extruded with the distance and direction of FIG. 25.

FIG. 26 illustrates the solid that is obtained as a result of the extrusion of the sketch of FIG. 25.

A further example of the computation of a global sweep direction and a global sweep length is now discussed. In this example, the computations are performed for each sketch and for each intersection loop of a sketch. The example is discussed in relation with FIG. 27 that illustrates the principles of the computation of a sweep direction and a sweep length.

In this example, vectors having been computed upon identification of sketch and target points, the vectors are compared in order to determine if the surfaces of the intersections loops that are adjacent to each intersection loop of the sketch are parallel to the same direction of the vectors. If the test fails, that is, if the adjacent surfaces to the currently tested intersection loop of the sketch are not parallel to this same direction, then a common revolution axis that is consistent with all adjacent surfaces—the surfaces of the intersection loops that are adjacent to the currently tested intersection loop of the sketch—is detected.

The detection of the common revolution axis may comprise determining if the surfaces of the intersection loops that are adjacent to an intersection loop of the sketch belong to a primitive of the type selected among a cylinder, a cone, a sphere, and/or a torus. If it has been verified that the adjacent surfaces are surfaces of a primitive such as a cylinder, cone, sphere and/or tori, one checks these adjacent surfaces are defined with a same axis of revolution. If this is the case, then a further determination is performed; if the surfaces of the intersections loops that are adjacent (the adjacent surfaces) to an intersection loop of the sketch belong to a primitive of the type plane, one checks that the adjacent surfaces are orthogonal to the axis of revolution. If this is also the case, then the conditions are met to generate a solid from the sketch by revolving the sketch around the detected axis. Then, an angle for revolution is estimated for each sketch point and its corresponding target point. This estimation is performed as known in the art. From the common axis of revolution and the estimated angle, it is possible to apply the sweep operation.

Figure 27:
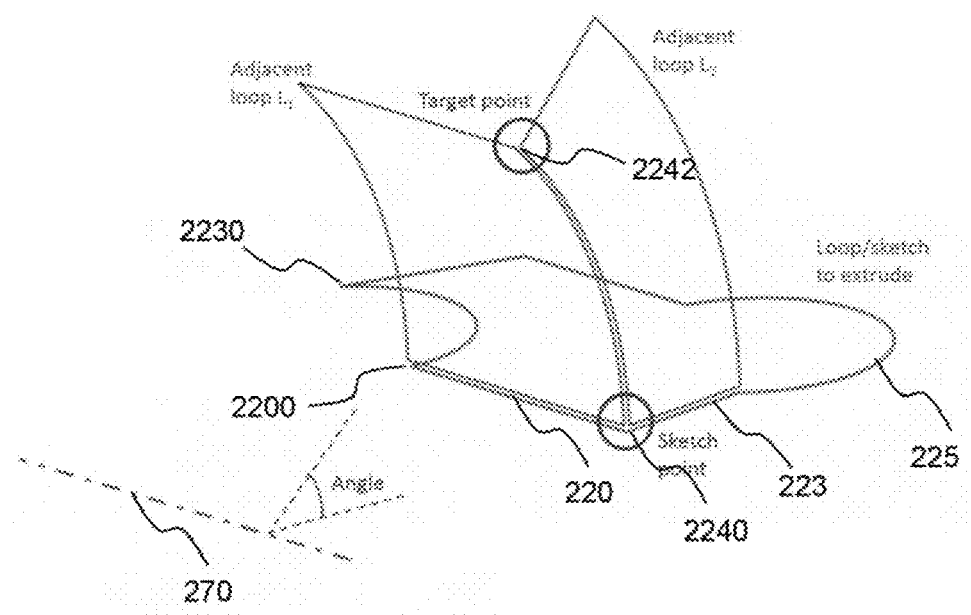
FIG. 27 illustrates an example of revolution angle from sketch points.

On FIG. 27, the adjacent surface supported by the curve 220 has been instantiated from a primitive of the type cylinder. This adjacent surface is parallel with the axis of revolution 270. This is also the case for the torus forming an intersection curve 225 with the instantiated plane. The adjacent plane 223 is perpendicular to the axis of revolution 270.

Figure 28:
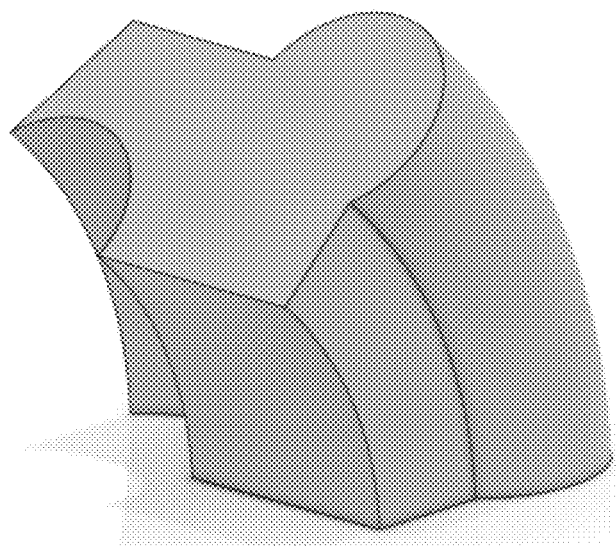
FIG. 28 illustrates an example of a revolution solid using the angle from FIG. 27.

FIG. 28 illustrates the solid that is obtained as a result of the extrusion of the sketch of FIG. 27.

In examples, no global angle of revolution may be determined, and therefore the angle of revolution that is applied for each sketch point is the one that is associated with its vector. Alternatively, the smallest value among the angle of revolution of the vectors may serves as a global angle of revolution. In another example, the largest value among the norms of the vector is identified and serves as global length of the extrusion. In a further example, an average of the angles of revolution is computed and serves as a global angle of revolution.

Examples of the computation of a sweep direction and a sweep length have been discussed. These examples can apply on the outer loop and on the inner loops. The computation of the sweep operation may be separately and independently performed for each intersection loop.

Figure 29:
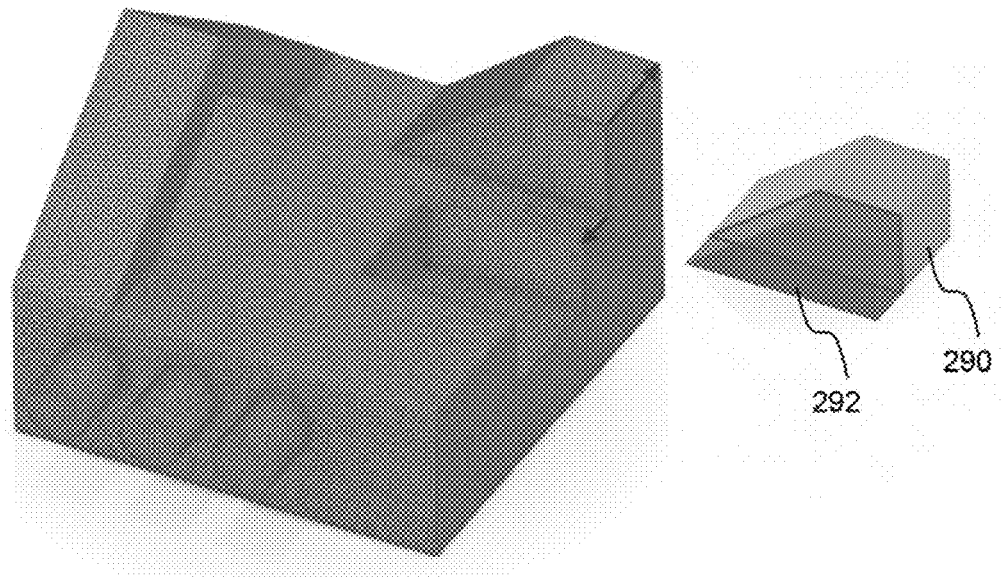
FIG. 29 illustrates an example of situation where two different extrusion directions are determined.

These examples of sweep operation mainly rely on the analysis of the geometrical and adjacent relations between the instantiated surfaces that share common intersections. In a specific example of computing the sweep operation, all possible solids are generated (e.g. for different extrusion directions), as illustrated on FIG. 29. This specific example may be used in the event several sweep lengths or angles of revolution are identified. After all the possible solids have been generated, the solids are compared with the provided mesh, for instance by using similarity score of each solid with a local part of the input mesh. The solid that best fits the mesh locally, i.e. that has the least distance to the mesh, is kept. In the example of FIG. 29, the extrusion 292 is eliminated and the extrusion 290 is kept.

In another specific example of sweep operation, one detects that several extrusions lead to equivalent solids. Equivalent solids are solids with an identical or almost identical geometrical shape. For example, there are six different extrusions with six different sketches on a cuboid, but all lead to the same shape. Equivalent solids may be detected in the case all the possible solids are generated. Equivalent solids may also be detected if a comparison of the generated solids is performed for solids obtained from sketches with at least one common intersection. When equivalent solids are identified, only one of them is kept. If there is more than a single solid that best fits the input mesh locally (e.g. in the case of a cuboid), and if it is determined that they are identical, one chooses the one that minimizes the global number of different sketch planes used for the entire feature tree. This contributes to limit the expansion size of the feature tree.

Figure 30:
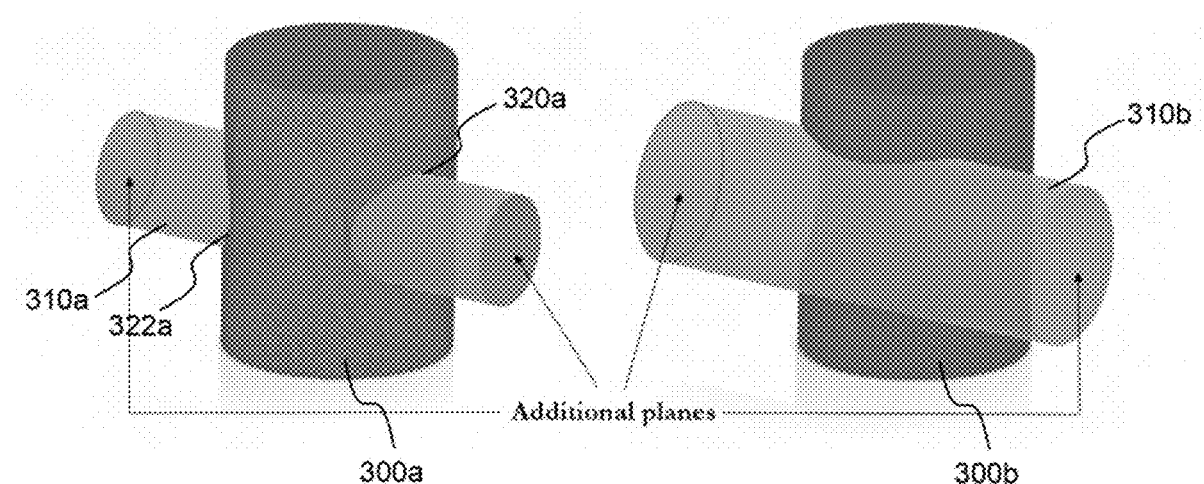
FIG. 30 illustrates an example of situation in which an additional plane is added for sketch construction.

In a further specific example, there are cases for which it is not possible to generate sketches on the planes that were detected on the input mesh. For instance, this is the case when an instantiated surface is not adjacent to any plane. FIG. 30 illustrates an example of such a situation in which the mesh is a cylinder 300*a*, respectively 300*b* that comprises a cavity having the shape of a cylinder 310*a*, respectively 310*b*. The cavity may form a through hole in the cylinder 300*a* or an open hole in the cylinder 300*b*. For the sake of explanations of the figure, the cavity is represented by cylinder 310*a*, 310*b*, being understood that these cylinders are not present in the mesh. The cavities are represented by a node in the geometric and adjacency graph of the mesh;

however, no plane is derivable from the provided mesh that could serve for generating a sketch of the cavity.

To address this situation, one or more additional planes may be created that are required to generate these sketches. The detection can be performed after the instantiation of each node of the graph.

The instantiated new plane may be located outside the bounds of the mesh in order to ensure that the extrusion/revolution to be created is sufficiently large. The new plane may be oriented perpendicular to the instantiated surface so that a projection on the new plane of the intersection of the instantiated surface with adjacent surfaces is representative of primitive implicitly present in the mesh (but not represented by faces of the mesh).

On FIG. 30, for each cylinder 300a, 300b, additional planes have been added outside the bound of the mesh (there are no intersections between the mesh and the added planes). More precisely, a new plane is added for each intersection loop of the cylinder for which no plane is derivable from the provided mesh that could serve for generating a sketch of the instantiated surface. In FIG. 30, two planes are added for the cylinder 300a as two intersections 320a, 322a are derivable from the graph. Two planes are also added for the cylinder 300b, even if there is only one intersection as the cavity is open. Adding two planes in front of each other allows to improve the coverage of more complex geometries of the mesh. The added planes are perpendicular to the instantiated surface 310a, 310b; this increases the chances to obtain a valid solid that will be close to the geometry of the provided mesh.

Once the new plane has been placed, an intersection is computed between the instantiated surface and the new plane. The intersection may form an intersection loop, or not. In the latter case, the intersection is closed in order to form a loop. The closure of the intersection may be done so that the intersection loop has a shape of known primitive. In FIG. 30, the intersections on the two planes for the cylinder 300b are not closed; in this example, the intersections loops are closed in order to keep a regular curved shape.

Next, a sketch is computed from the intersection loop. This is performed as already discussed.

Examples of sketch generation have been discussed. However, there are situations for which it is not possible to generate a sketch. For example, when the surfaces of the intersections loops that are adjacent to currently tested intersection loop of the sketch are not parallel to a same direction of the vector, no solid can be generated. Similarly, if the conditions are not met to generate a solid from the sketch by revolving the sketch around a detected axis, then no solid is generated. In such situation, a generic solid may be computed that can be manually defined by a designer at a later stage.

Back to FIG. 19, a set of possible combinations of add or remove operations between the obtained solids are computed (S150). For each computed combination, a final solid is obtained. Here the add and remove operations refers to Boolean operations. Add operation means that the solid computed for a sketch represents matter in the final solid, while the remove operation means that the solid computed for a sketch represents a volume empty of matter.

In examples, the set of possible combinations may comprise all the possible combinations. Thus, all the combinations are computed.

In examples, the convexity information of the graph is used for decreasing the number of combinations of add and remove operations. In addition, the knowledge of the convexity information is used together with the knowledge whether an intersection loop of the sketch from which a solid is computed is an inner or outer intersection loop. These two pieces of information make it possible to determine on which side of the sketch plane the volume matter is located. Comparing this direction with the extrusion direction obtained earlier (or, for that matter, with the direction of the sketch revolution), allows to determine whether a solid adds or removes matter.

Figure 31:
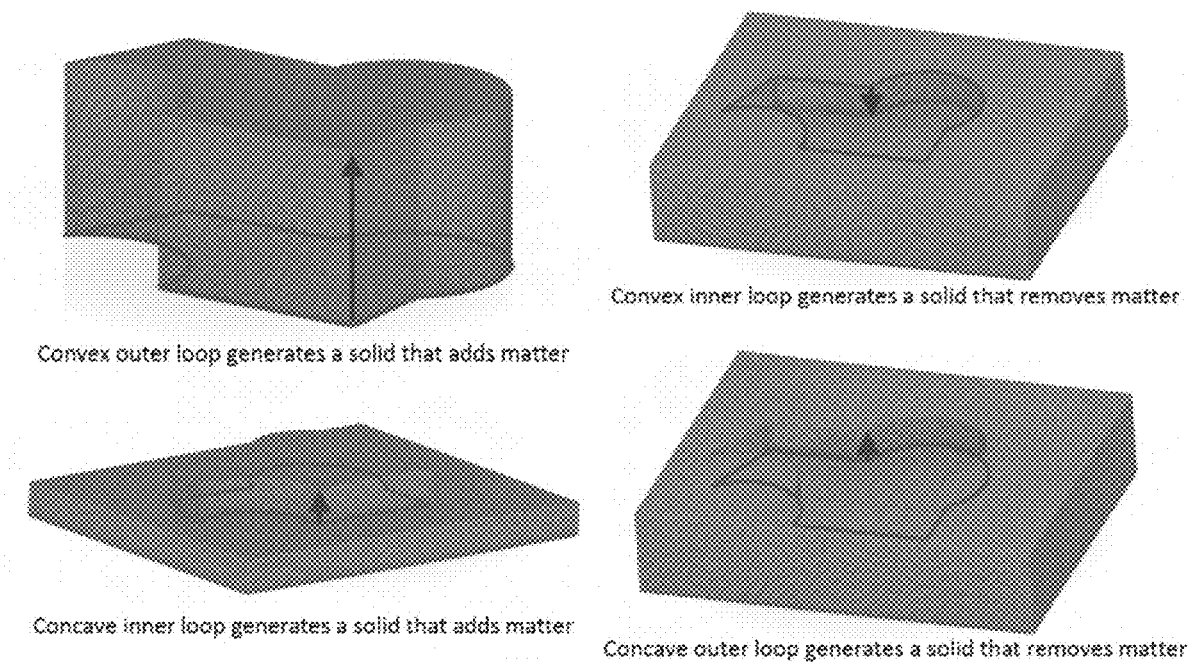
FIG. 31 illustrates four examples of add or remove Boolean operation selection from convexity information.
Figure 32:
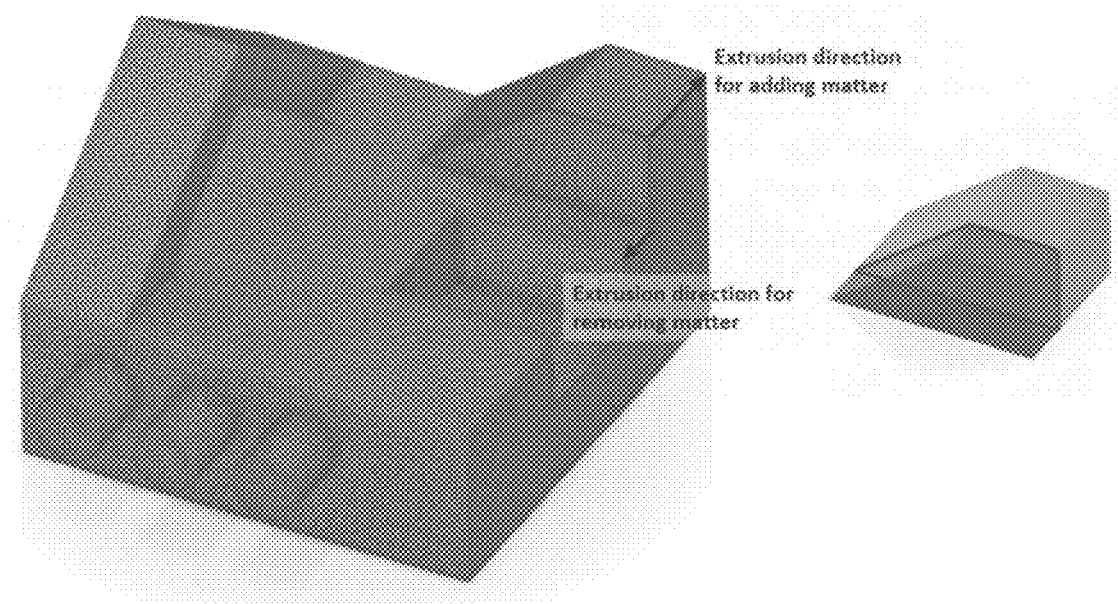
FIG. 32 illustrates add or remove Boolean operation based on extrusion direction and convexity information.

Referring now to FIG. 31, rules for determining whether a solid contributes to an add or remove operation are now discussed. When a solid is generated with an outer intersection loop that is convex, then the generated solid adds matter, that is, the generated solid is used for an add Boolean operation. When a solid is generated with an outer intersection loop that is concave, then the generated solid is used for a remove Boolean operation. When a solid is generated with an inner intersection loop that is concave, the generated solid is used for an add Boolean operation. And when a solid is generated with an inner intersection loop that is convex, then the generated solid is used for a remove Boolean operation.

The use of these rules highly decreases the number of combinations of the set to be computed, compared to the exhaustive solution where all the combinations are computed. Therefore, contributes to decrease the use of computing resources for carrying out during S150.

In examples, the global convexity of an outer or inner intersection loop (or inversely the global concavity of an intersection loop) may not be determined. In such situations, the rules previously discussed cannot apply. In such situation where the convexity or concavity of an intersecting loop is not no determinable, then both add and remove Boolean operations will be used for the solid generated from the intersection loop.

Since not all sketches are generated from loops for which a global convexity may be determined, two solids are thus computed, one that must be removed and another that will be added. These are cases for which different extrusion directions have been determined, as already discussed in reference with FIG. 29. Interestingly, a comparison with the input mesh makes it possible to keep only one of the two solids.

In examples, an analysis of the graph is made for determining orders of operations between the solids, and thus for decreasing the number of combinations of the set. The analysis relies on the assumption that since the addition operation is associative and commutative, the solids that add matter (that is, the generated solid is used for an add Boolean operation) can be added in arbitrary order. However, if solids that must be removed are detected (the solid is used for a remove Boolean operation), the order of Boolean operations can no longer be arbitrary and must be considered with care. The analysis of the graph identifies simple, but frequent, situations for which the location of remove operations in the feature tree can be specified. This is possible because all solids are generated only up to the boundary of the solid and do not penetrate its volume, i.e. there is no risk of unforeseen collision between solids (other than the one detected when analyzing the adjacency graph).

A first analysis of the graph for determining order of operations is presented. If a solid B is to be used with a remove operation and is adjacent only to the faces of a single generated solid A to be used with an add operation, the remove operation of the solid B is placed right after the add operation of the solid A. Said otherwise, the add and remove operations are performed with the order A–B.

Figure 33:
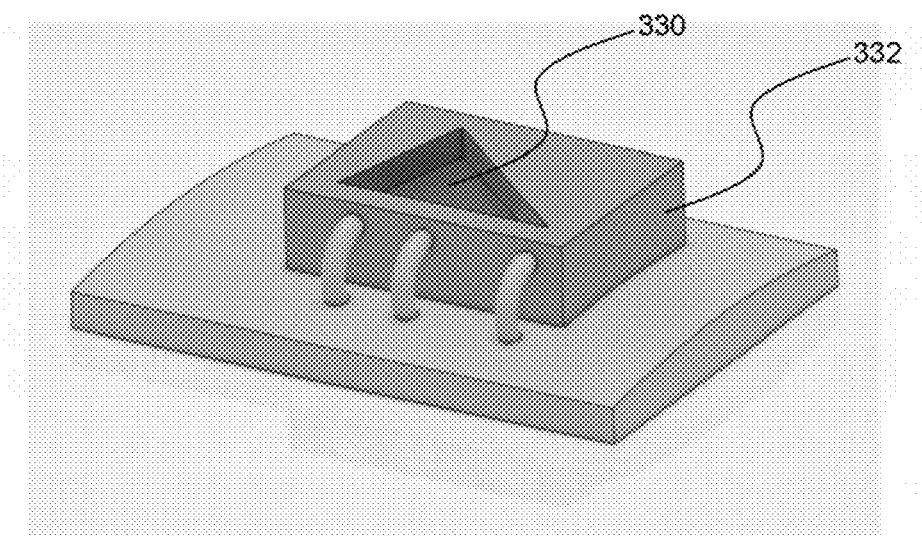
FIGS. 33, 34 and 35 illustrate examples of situations for which the location of remove operations can be specified in the feature tree.

Referring now to FIG. 33, the solid 332 is associated with an add operation and the solid 330 (a triangular pad) is associated with a remove operation. The faces of the solid 330 result from the removal of an extrusion that is adjacent to the solid 332.

A second analysis of the graph for determining order of operations is presented. If a solid B is to be used with a remove operation and is adjacent only to the faces of two or more generated solids A and C to be used with an add operation, the remove operation of the solid B is performed after the add operations of the solids A and C. Said otherwise, the add and remove operations are performed with the order A+C−B.

Figure 34:
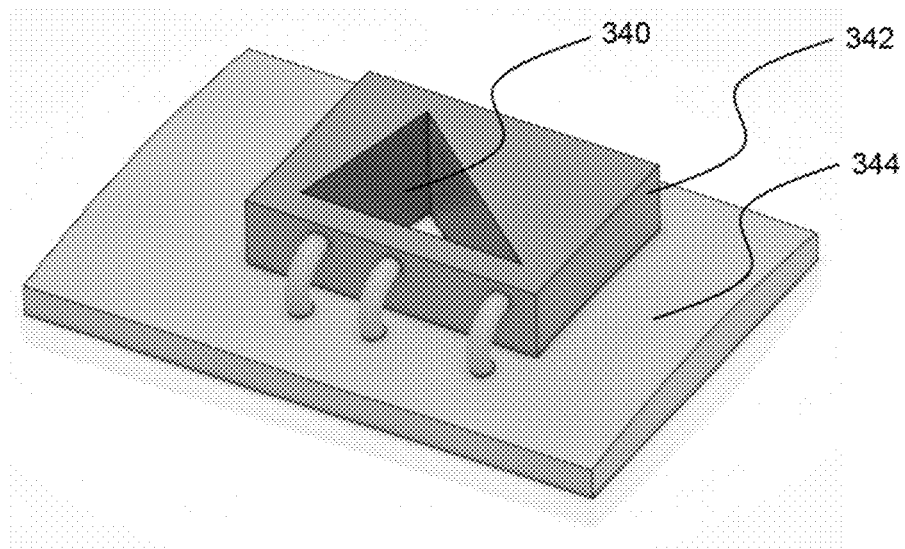

Referring now to FIG. 34, the solid 340 (a triangular pad) is associated with a remove operation, and the solids 342 and 344 are associated with an add operation. The faces of the solid 340 are adjacent to the faces of the solids 342 and 344. The faces of the solid 340 thus result from the removal of the extrusion of the triangle pad that is adjacent to the pads 342 and 344.

A third analysis of the graph for determining order of operations is presented by building upon the previous example discussed in reference to FIGS. 33 and 34. If a solid D to be used with an add operation is adjacent only to the faces of one single generated solid B to be used with a remove operation, and if the solid B is adjacent only to the faces of one single generated solid A to be used with an add operation or is adjacent only to the faces of two or more generated solids to be used with an add operation, then a remove operation of the solid D is first performed on the solid B. And then the result of this first operation is removed from the remaining solid. Said otherwise, the add and remove operations are performed with the order A+C−(B−D).

Figure 35:
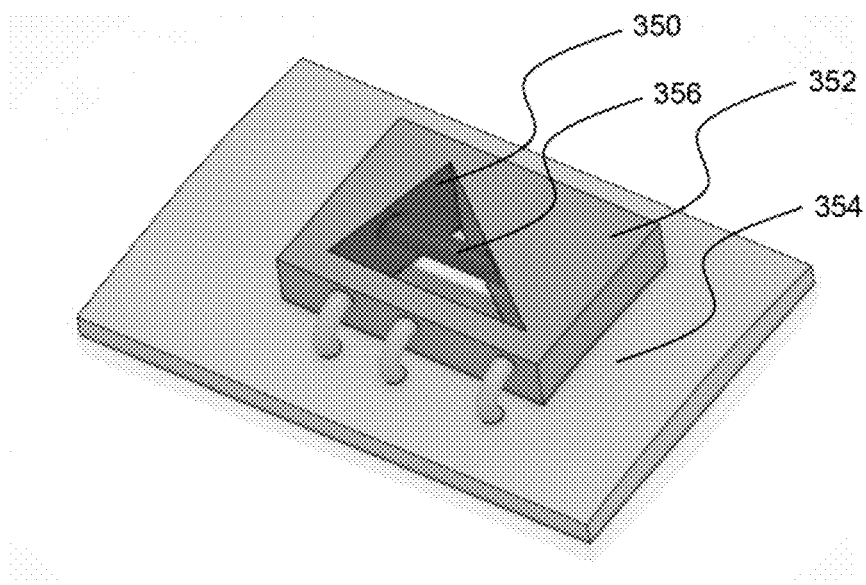

Referring now to FIG. 35, the solid 350 (a triangular pad) is associated with a remove operation, and the solids 352 and 354 are associated with an add operation. The faces of the solid 350 are adjacent to the faces of the solids 352 and 354. Solid 356 is result from the removal of an extrusion cylinder from the solid 350, the result of which is removed from the pads 352 and 354.

Referring back to FIG. 19, at S160, a similarity score is computed for each final solid with the provided mesh. This is performed using any known technique in the art that allows to objectify (e.g. measuring) the differences between a mesh and a solid. As a result of S160, a ranking of the final solids may be provided: the most similar final solid to the less similar final solid.

Then, at S170, the final solid that is the most similar with the provided mesh is identified based on the similarity score, e.g. the one with the highest ranking. This is performed as known in the art. The combination of add or remove operations of the identified most similar final solid corresponds to the feature tree of the mesh. This means that each solid computed from a sketch is associated with an operation, and therefore each computed sketch with its sweep operation form a couple that is associated with an add or remove Boolean operation. In an example, the feature tree may comprise couples of (sketch, sweep operation, Boolean operation) forming leaves of the feature tree in an order provided by the retained combination of operations. The couples may further comprise the parameters of the sweep operation; for instance, the type of sweep operation (extrusion, revolution, undefined), the direction and the length value for an extrusion, the revolution axis and the revolution angle for a revolution.

In examples, the method may comprise displaying a graphical representation of the feature tree. The feature tree may be editable by the user. The representation of the feature tree may include a tree arrangement of graphical items representing each a corresponding leaf geometrical shape or geometrical operation. The edition may comprise selecting a graphical item, for example by graphical-interaction. Graphical-interaction herein means operating a haptic device to activate pixels at a location corresponding to the position of the graphical item on the display. For example, a mouse cursor may be positioned over the displayed graphical item, or the displayed graphical item may be touched directly via a touch screen or indirectly via a touch pad. The selection may trigger opening of a dialog box or the like, and entering one or more parameter values by the user, for example via a keyboard.

In examples, the method may comprise displaying a graphical representation of the provided mesh, and meanwhile, by a user, launching the method for extracting the feature tree from the mesh, and as a result, displaying the graphical representation of the extracted (one could also say generated) feature tree simultaneously to the graphical representation of the discrete geometrical representation. The user may then hide the graphical representation of the mesh for edition of the feature tree. Alternatively, the method may continue to display both graphical representations of the mesh and the extracted feature tree simultaneously, and upon the user performing an edition on the feature tree, the method may update (e.g. change) the graphical representation of the mesh accordingly. This provides visual feedback to the user performing editions. Inversely, the user can modify the provided mesh, e.g. by displacing one or more elements forming the mesh (vertices, edges, faces, . . . ) and update the feature tree by executing the method for generating the feature tree.

In examples, the method is configured for taking as input a 3D mesh or 3D point cloud determined from physical measurements on a real object, and the method allows determining a corresponding editable feature tree representing the 3D shape of the real object. A user may then perform editions of the editable feature tree, for example to create a design resembling the real object but different therefrom. In alternative and additional examples, the method is configured for taking as input a 3D mesh of a 3D modeled object having no corresponding editable feature tree, received from a distant computer system or retrieved from non-volatile memory, and the method allows determining a corresponding editable feature tree representing the 3D shape. A user may then perform editions of the editable feature tree, for example to create a design resembling the 3D mesh but different therefrom, or to complete the design formed by the 3D mesh.

In addition or alternatively to the possibility of performing editions of the 3D shape in a more ergonomic manner, the obtention of the feature tree may serve other purposes, such as 3D shape merging or mechanical simulation.

A 3D shape merging method may comprise providing, at a computer system, a first feature tree representing a first 3D shape, providing a mesh of a second 3D shape, performing the method on the mesh to obtain a second feature tree representing the second 3D shape, and merging the first feature tree and the second feature tree. The merging may be performed according to any merging technique and/or to represent a mechanical assembly or a mechanical cooperation between the first 3D shape and the second 3D shape. The merging may for example comprise connecting the second tree to the first tree. The 3D shape merging method may further comprise applying a geometric model to the merged tree so as to obtain a graphical representation of the 3D shape thereby represented, and/or display said graphical representation to a user.

A mechanical simulation may be performed based on the feature tree. Indeed, since the feature tree represents the 3D shape in a compact (relative to the discrete geometrical representation) and parameterized manner, mechanical computations may be performed more accurately on the feature obtained with the present method. In particular, it is easier and more direct to calculate a finite element mesh from a CSG (as taught by paper "Finite-element mesh generation from constructive-solid-geometry models", Edwin Boender, Willem F. Bronsvoort, Frits H. Post, in Computer-Aided Design, Volume 26, Issue 5, May 1994, Pages 379-392 or by paper "Finite element mesh generation methods: a review and classification", K Ho-Le, in 38 Computer-Aided Design, volume 20 number 1 January/February 1988). In addition, the CSG offers guarantees of waterproofness of the surface. The mechanical simulation may thus comprise computing one or more finite element meshes from the feature tree (e.g. CSG) and/or one or more modifications thereof, and then performing a finite element analysis based on each finite element mesh. Also, one can easily optimize a CSG according to the results of simulation since the CSG is parameterized. Thus, the one or more modifications may be for optimizing the editable feature tree (e.g. CSG) based on each previous finite element analysis result.

The invention claimed is:

1. A computer-implemented method implemented by a computer aided denim (CAD) system for extracting a feature tree from a mesh, the method comprising:
   obtaining a mesh;
   computing a geometric and adjacency graph of the provided mesh, wherein:
   each node of the graph represents one region of the mesh and includes a primitive type and parameters of the region,
   each connection between two nodes is an intersection between the respective surfaces of the regions represented by the two connected nodes;
   instantiating, for each node of the graph, a surface based on the identified primitive type and parameters of the region; and
   for each instantiated surface of each node of the graph;
   computing one or more intersection loops, the one or more intersection loops including one outer intersection loop and, when the one or more intersection loops include more than one intersection loop, one or more inner intersection loops, each intersection loop of the one or more intersection loops being obtained from an ordered list of nodes of the graph that are connected to the said each node,
   computing, from each computed intersection loop of the one or more intersection loops, a respective sketch,
   applying a sweep operation to each computed sketch therefore generating a solid for each sketch,
   computing a set of possible combinations of add or remove operations between the obtained solids, and obtaining a final solid for each computed combination,
   computing a similarity score of each final solid with the input mesh, and
   identifying the most similar final solid with the input mesh based on the similarity score, the combinations of add or remove operations of the identified most similar final solid corresponding to the feature tree of the mesh.

2. The computer-implemented method of claim 1, wherein computing a set of possible combinations of add or remove operations between the obtained solids includes:
   using an add operation for a solid generated with an outer intersection loop that is convex,
   using a remove operation for a solid generated with an outer intersection loop that is concave,
   using an add operation for a solid generated with an inner intersection loop that is concave, and
   using a remove operation for a solid generated with an inner intersection loop that is convex.

3. The computer-implemented method of claim 2, wherein computing a set of possible combinations of add or remove operations between the obtained solids further includes:
   for each generated solid with an outer intersecting loop with no determinable convexity or concavity, using both an add and a remove operation.

4. The computer-implemented method of claim 2, wherein computing a set of possible combinations of add or remove operations between the obtained solids further includes:
   if a solid to be used with a remove operation is adjacent only to the faces of one single generated solid to be used with an add operation, performing the remove operation after the add operation,
   if a solid to be used with a remove operation is adjacent only to the faces of two or more generated solids to be used with an add operation, preforming the remove operation after the add operation, and
   if a solid to be used with an add operation is adjacent only to the faces of one single generated solid to be used with a remove operation, and if the solid to be used with the remove operation is adjacent only to the faces of one single generated solid to be used with an add operation or is adjacent only to the faces of two or more generated solids to be used with an add operation, first performing a remove operation of the solid to be used with an add operation on the solid to be used with a remove operation and then only performing a remove operation of the result of the remove performed first.

5. The computer-implemented method of one of claim 1, wherein applying a sweep operation to each computed sketch therefore generating a solid for each sketch includes:
   computing for each sketch, a sweep direction and a sweep length from the intersections loops that are adjacent to the one outer intersection loop and from the intersections loops that are adjacent to the one or more inner intersection loops of the sketch.

6. The computer-implemented method of claim 5, wherein computing the sweep direction and the sweep length is performed for the one outer intersection loop of the sketch and for each of the possible one more intersection loops, the computing including, for each intersection loop of the sketch:
   identifying one or more sketch points on the intersection loop, a sketch point being a point that is common to the intersections loops that are adjacent to the intersection loop of the sketch,
   for each identified sketch point, identifying a target point that is a point common to the intersections loops that are adjacent to the intersection loop of the sketch, and
   computing for each sketch point a vector joining the sketch point to the target point, the direction of the vector being the sweep direction and the norm of the vector being the sweep length.

7. The computer-implemented method of claim 6, further comprising, when two or more vectors have been computed:
  determining that the vectors have a same direction and that the surfaces of the intersections loops that are adjacent to each intersection loop of the sketch are parallel to this same direction; and
  applying the sweep operation that is an extrusion therefore generating the solid of the sketch.

8. The computer-implemented method of claim 7, further comprising
  for each different value of the norms of the vectors, applying the sweep operation, or
  selecting the smallest value among the values and applying the sweep operation for the selected value.

9. The computer-implemented method of claim 6, further comprising, when two or more vectors have been computed:
  determining that the vectors have a same direction and that one or more surfaces of the intersections loops that we adjacent to each intersection loop of the sketch are not parallel to this same direction;
  detecting a common revolution axis to all the surfaces of the intersections loops that are adjacent to each intersection loop of the sketch are parallel to this same direction;
  estimating an angle for revolution for each sketch point and its corresponding target point; and
  applying the sweep operation that is a revolution around the detected common revolution axis to the estimated angle.

10. The computer-implemented method of claim 9, further comprising, when detecting the common revolution axis:
  if the surfaces of the intersections loops that are adjacent to an intersection loop of the sketch belong to a primitive of the type selected among a cylinder, a cone, a sphere, and/or a torus, verifying that the adjacent surfaces are defined with the axis of revolution; and
  if the surfaces of the intersections loops that are adjacent to an intersection loop of the sketch belong to a primitive of the type plane, verifying that the adjacent surfaces are parallel or orthogonal to the axis of revolution.

11. The computer-implemented method of claim 10, further comprising:
  for each different value of the estimation of the angle for revolution, applying the sweep operation, or
  selecting the smallest value among the values and applying the sweep operation for the selected value.

12. The computer-implemented method of claim 1, further comprising, after instantiating, for each node of the graph, a surface based on the identified primitive type and parameters of the region:
  detecting that the instantiated surface as not adjacent with any plane;
  instantiating a new plane outside the bounds of the mesh;
  computing an intersection of the instantiated surface with the new plane, the intersection forming a loop on the new plane; and
  computing at least one sketch from the intersection loop.

13. A non-transitory computer readable storage medium having recorded thereon a computer program comprising instructions for performing a method implemented by a computer aided design (CAD) system for extracting a feature tree from a mesh, the method comprising:
  obtaining a mesh;
  computing a geometric and adjacency graph of the provided mesh,
wherein:
  each node of the graph represents one region of the mesh and comprises a primitive type and parameters of the region, and
  each connection between two nodes is an intersection between the respective surfaces of the regions represented by the two connected nodes;
  instantiating for each node of the graph, a surface based on the identified primitive type and parameters of the region; and
  for each instantiated surface of each node of the graph:
    computing one or more intersection loops, the one or more intersection loops including one outer intersection loop and, when the one or more intersection loops include more than one intersection loop, one or more inner intersection loops, each intersection loop of the one or more intersection loops being obtained from an ordered list of nodes of the graph that are connected to the said each node,
    computing, from each computed intersection loop of the one or more intersection loops, a respective sketch,
    applying a sweep operation to each computed sketch therefore generating a solid for each sketch,
    computing a set of possible combinations of add or remove operations between the obtained solids, and obtaining a final solid for each computed combination,
    computing a similarity score of each final solid with the input mesh, and
    identifying the most similar final solid with the input mesh based on the similarity score, the combinations of add or remove operations of the identified most similar final solid corresponding to the feature tree of the mesh.

14. The non-transitory computer readable storage of claim 13, wherein computing a set of possible combinations of add or remove operations between the obtained solids includes:
  using an add operation for a solid generated with an outer intersection loop that is convex;
  using a remove operation for a solid generated with an outer intersection loop that is concave;
  using an add operation for a solid generated with an inner intersection loop that is concave; and
  using a remove operation for a solid generated with an inner intersection loop that is convex.

15. The non-transitory computer readable storage of claim 14, wherein computing a set of possible combinations of add or remove operations between the obtained solids further includes:
  for each generated solid with an outer intersecting loop with no determinable convexity or concavity, using both an add and a remove operation.

16. The non-transitory computer readable storage of claim 14, wherein computing a set of possible combinations of add or remove operations between the obtained solids further includes:
  if a solid to be used with a remove operation is adjacent only to the faces of one single generated solid to be used with an add operation, performing the remove operation after the add operation,
  if a solid to be used with a remove operation is adjacent only to the faces of two or more generated solids to be used with an add operation, performing the remove operation after the add operations, and
  if a solid to be used with an add operation is adjacent only to the faces of one single generated solid to be used with a remove operation, and if the solid to be used with the remove operation is adjacent only to the faces of one single generated solid to be used with an add operation or is adjacent only to the faces of two or more generated solids to be used with an add operation, first performing a remove operation of the solid to be used with an add operation on the solid to be used with a remove operation and then only performing a remove operation of the result of the remove performed first.

17. The computer readable storage of claim 13, wherein applying a sweep operation to each computed sketch therefore generating a solid for each sketch includes:
   computing, for each sketch, a sweep direction and a sweep length from the intersections loops that are adjacent to the one outer intersection loop and from the intersections loops that are adjacent to the one or more inner intersection loops of the sketch.

18. The computer readable storage of claim 17, wherein computing the sweep direction and the sweep length is performed for the one outer intersection loop of the sketch and for each of the one or more intersection loops, the computing including for each intersection loop of the sketch:
   identifying one or more sketch points on the intersection loop, a sketch point being a point that is common to the intersections loops that are adjacent to the intersection loop of the sketch,
   for each identified sketch point, identifying a target point that is a point common to the intersections loops that are adjacent to the intersection loop of the sketch, and
   computing for each sketch point a vector joining the sketch point to the target point, the direction of the vector being the sweep direction and the norm of the vector being the sweep length.

19. The computer readable storage of claim 18, further comprising, when two or more vectors have been computed:
   determining that the vectors have a same direction and that the surfaces of the intersections loops that are adjacent to each intersection loop of the sketch are parallel to this same direction; and
   applying the sweep operation that is an extrusion therefore generating the solid of the sketch.

20. A system comprising:
   a processor coupled to a memory and a graphical user interface, the memory having recorded thereon a computer program comprising instructions implemented by a computer aided design (CAD) system for extracting a feature tree from a mesh that when executed by the processor causes the processor to be configured to
   obtain a mesh,
   compute a geometric and adjacency graph of the provided mesh,
   wherein
   each node of the graph represents one region of the mesh and comprises a primitive type and parameters of the region;
   each connection between two nodes is an intersection between the respective surfaces of the regions represented by the two connected nodes,
   instantiate for each node of the graph, a surface based on the identified primitive type and parameters of the region, and
   for each instantiated surface of each node of the graph the processor is configured to:
   compute one or more intersection loops, the one or more intersection loops including one outer intersection loop and, when the one or more intersection loops include more than one intersection loop, one or more inner intersection loops, each intersection loop of the one or more intersection loops being obtained from an ordered list of nodes of the graph that are connected to the said each node,
   compute, from each computed intersection loop of the one or more intersection loops, a respective sketch,
   apply a sweep operation to each computed sketch therefore generating a solid for each sketch,
   compute a set of possible combinations of add or remove operations between the obtained solids, and obtaining a final solid for each computed combination,
   compute a similarity score of each final solid with the input mesh, and
   identify the most similar final solid with the input mesh based on the similarity score, the combinations of add or remove operations of the identified most similar final solid corresponding to the feature tree of the mesh.

* * * * *